United States Patent
Liu et al.

(10) Patent No.: US 12,389,455 B2
(45) Date of Patent: Aug. 12, 2025

(54) MULTI-TRANSMITTER SCHEDULING USING SLOT-BASED AND SUB-SLOT BASED PHYSICAL SIDELINK SHARED CHANNELS

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US); Lik Hang Silas Fong, Bridgewater, NJ (US); Piyush Gupta, Bridgewater, NJ (US); Tao Luo, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/544,681

(22) Filed: Dec. 19, 2023

(65) Prior Publication Data
US 2024/0205974 A1    Jun. 20, 2024

Related U.S. Application Data

(63) Continuation of application No. 17/443,179, filed on Jul. 21, 2021, now Pat. No. 11,889,555.

(51) Int. Cl.
*H04W 74/0816*   (2024.01)
*H04W 52/52*   (2009.01)
*H04W 72/0446*   (2023.01)
*H04W 74/00*   (2009.01)

(52) U.S. Cl.
CPC ....... *H04W 74/0816* (2013.01); *H04W 52/52* (2013.01); *H04W 72/0446* (2013.01); *H04W 74/002* (2013.01)

(58) Field of Classification Search
CPC ............. H04W 74/0816; H04W 52/52; H04W 72/0446; H04W 74/002; H04W 72/40; H04W 74/0808
See application file for complete search history.

(56) References Cited

U.S. PATENT DOCUMENTS

| | | | |
|---|---|---|---|
| 11,671,890 B2 | 6/2023 | Zhang et al. | |
| 2020/0029340 A1* | 1/2020 | He | H04W 72/56 |
| 2020/0084811 A1 | 3/2020 | Uchiyama et al. | |
| 2023/0012562 A1* | 1/2023 | Liu | H04W 52/52 |
| 2023/0022077 A1 | 1/2023 | Liu et al. | |

FOREIGN PATENT DOCUMENTS

WO   WO-2022266816 A1 * 12/2022 ......... H04L 27/0006

* cited by examiner

*Primary Examiner* — Rina C Pancholi
(74) *Attorney, Agent, or Firm* — Harrity & Harrity, LLP

(57) ABSTRACT

Wireless communications systems and methods related to communicating control information are provided. A method of wireless communication performed by a user equipment (UE) may include performing a clear channel assessment (CCA), transmitting, to a first UE based on the CCA being successful, a first transport block (TB) via a first sub-PSSCH associated with a first sub-slot, and transmitting, to at least one of the first UE or a second UE, a second TB via a PSSCH associated with a slot.

30 Claims, 10 Drawing Sheets

MULTI-TRANSMITTER SCHEDULING USING SLOT-BASED AND SUB-SLOT BASED PHYSICAL SIDELINK SHARED CHANNELS

CROSS-REFERENCE TO RELATED APPLICATIONS

The present application for patent is a Continuation of U.S. patent application Ser. No. 17/443,179 by Liu et al., entitled "MULTI-TRANSMITTER SCHEDULING USING SLOT-BASED AND SUB-SLOT BASED PHYSICAL SIDELINK SHARED CHANNELS" filed Jul. 21, 2021, assigned to the assignee hereof, and which is expressly incorporated by reference herein.

TECHNICAL FIELD

This application relates to wireless communication systems, and more particularly to methods and devices for wireless communication using slot-based and sub-slot based physical sidelink shared channels in unlicensed spectrum.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE) may include performing a clear channel assessment (CCA); transmitting, to a first UE based on the CCA being successful, a first transport block (TB) via a first sub-PSSCH associated with a first sub-slot; and transmitting, to at least one of the first UE or a second UE, a second TB via a PSSCH associated with a slot.

In an additional aspect of the disclosure, a method of communication performed by a user equipment (UE) may include receiving, from another UE, a first transport block (TB) via a sub-PSSCH associated with a sub-slot; and receiving, from the other UE, a second TB via a PSSCH associated with a slot.

In an additional aspect of the disclosure, a UE may include a transceiver, a memory, and a processor coupled to the transceiver and the memory, the UE may be configured to perform a clear channel assessment (CCA); transmit, to a first UE based on the CCA being successful, a first transport block (TB) via a first sub-PSSCH associated with a first sub-slot; and transmit, to at least one of the first UE or a second UE, a second TB via a PSSCH associated with a slot In an additional aspect of the disclosure, a UE may include a transceiver, a memory, and a processor coupled to the transceiver and the memory, the UE may be configured to receive, from another UE, a first transport block (TB) via a sub-PSSCH associated with a sub-slot; and receive, from the other UE, a second TB via a PSSCH associated with a slot Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
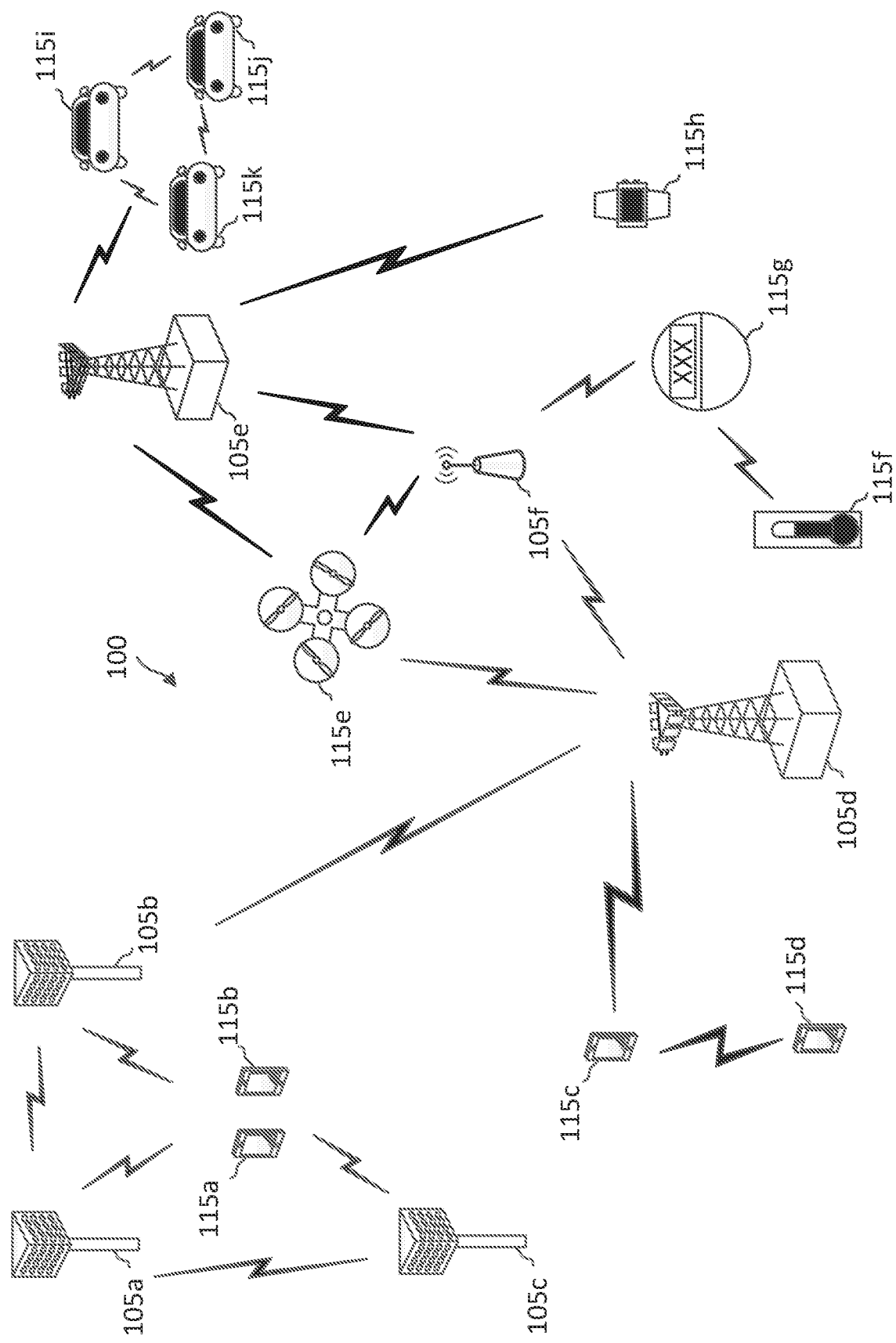
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for a UE to gain access to a channel in unlicensed spectrum during a sub-slot of a current slot by performing a successful CCA and retain the channel across a slot boundary into an adjacent subsequent slot. In some instances, the UE may retain the channel during the subsequent slot without performing another CCA. For example, the UE may transmit a first TB via a sub-PSSCH in the sub-slot and transmit a second TB via a PSSCH in the subsequent slot without performing another CCA. By the UE transmitting at least one TB within at least one sub-slot of the current slot followed by transmitting another TB in an adjacent slot without performing another CCA, the UE may increase the capacity of the wireless network and/or reduce UE power consumption as compared to performing an additional CCA in order to transmit another TB in the adjacent slot.

In some aspects of the present disclosure, the latency and/or spectral efficiency of wireless communications, including sidelink control and data communications in unlicensed spectrum, may be reduced by a UE transmitting at least one TB within at least one sub-slot of the current slot followed by transmitting another TB in an adjacent slot without performing another CCA.

In accordance with the present disclosure, partitioning a slot into multiple sub-slots and transmitting at least one TB within at least one sub-slot of the current slot followed by transmitting another TB in an adjacent slot without performing another CCA may facilitate more efficient use and optimization of the frequency resources, higher reliability of the wireless communications network, and reduced transmission latency. In this regard, wireless communication applications requiring low latency such as vehicle-to-everything (V2X) and industrial Internet-of-Things (IoT) may benefit from the methods and devices of the present disclosure.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames.

A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the UE 115g (e.g., a meter, a programmable logic controller, an IoT device, a robot, a vehicle, a smartphone, etc.) may map a sub-PSCCH, sub-PSSCH, sidelink control information (SCI), and an automatic gain control (AGC) symbol to a sub-slot of a plurality of sub-slots of a slot. A sub-PSSCH may be a PSSCH mapped to a set of symbols of the sub-slot. As described in detail below with reference to FIGS. 3-5, a sub-slot may include a number of symbols within a slot. A slot may include a plurality of sub-slots, each sub-slot including a number of symbols. A sub-PSSCH may carry information including, without limitation, a second stage SCI-2, a transport block, or padding. In some aspects, the UE 115g may map multiple sub-PSSCHs, SCI, and AGC symbols to multiple sub-slots within a slot. The UE 115g may transmit, to at least one other UE 115, a transport block (TB) via the sub-PSSCH of the sub-slot. In some instances, the UE 115g may gain access to the wireless channel by performing an LBT/CCA. The UE 115g may transmit the TB based on a successful CCA. The UE may retain the channel during the subsequent slot without performing another CCA. For example, the UE may transmit a TB via a sub-PSSCH in the sub-slot and transmit another TB via a PSSCH in the subsequent slot without performing another CCA. In this manner, the UE 115g may increase the utilization of time/frequency resources of the wireless network as compared to transmitting another TB in the slot by performing another successful CCA.

In some aspects, the BS 105f may transmit, to UE 115g, a configuration indicating a plurality of sub-slots within a slot. The configuration may include, without limitation, resources associated with a sub-slot of a plurality of sub-slots, a starting subchannel index associated with the sub-slot, a number of subchannels associated with the sub-slot, a modulation and coding scheme associated with the sub-slot, a beta offset associated with the sub-slot, or a search space period associated with the plurality of sub-slots. In this regard, the BS 105f may transmit the configuration in an RRC configuration message, a DCI message, and/or a MAC control element signaling via a physical downlink shared channel (PDSCH), a physical downlink control channel (PDCCH), or other suitable channel. The configuration transmitted by the BS 105f may be received by the UE 115g and used by the UE 115g to partition a slot into sub-slots, map the sub-PSSCHs, SCI, and AGC symbols to the sub-slots, configure the SCI-1, and/or configure the SCI-2.

Figure 2:
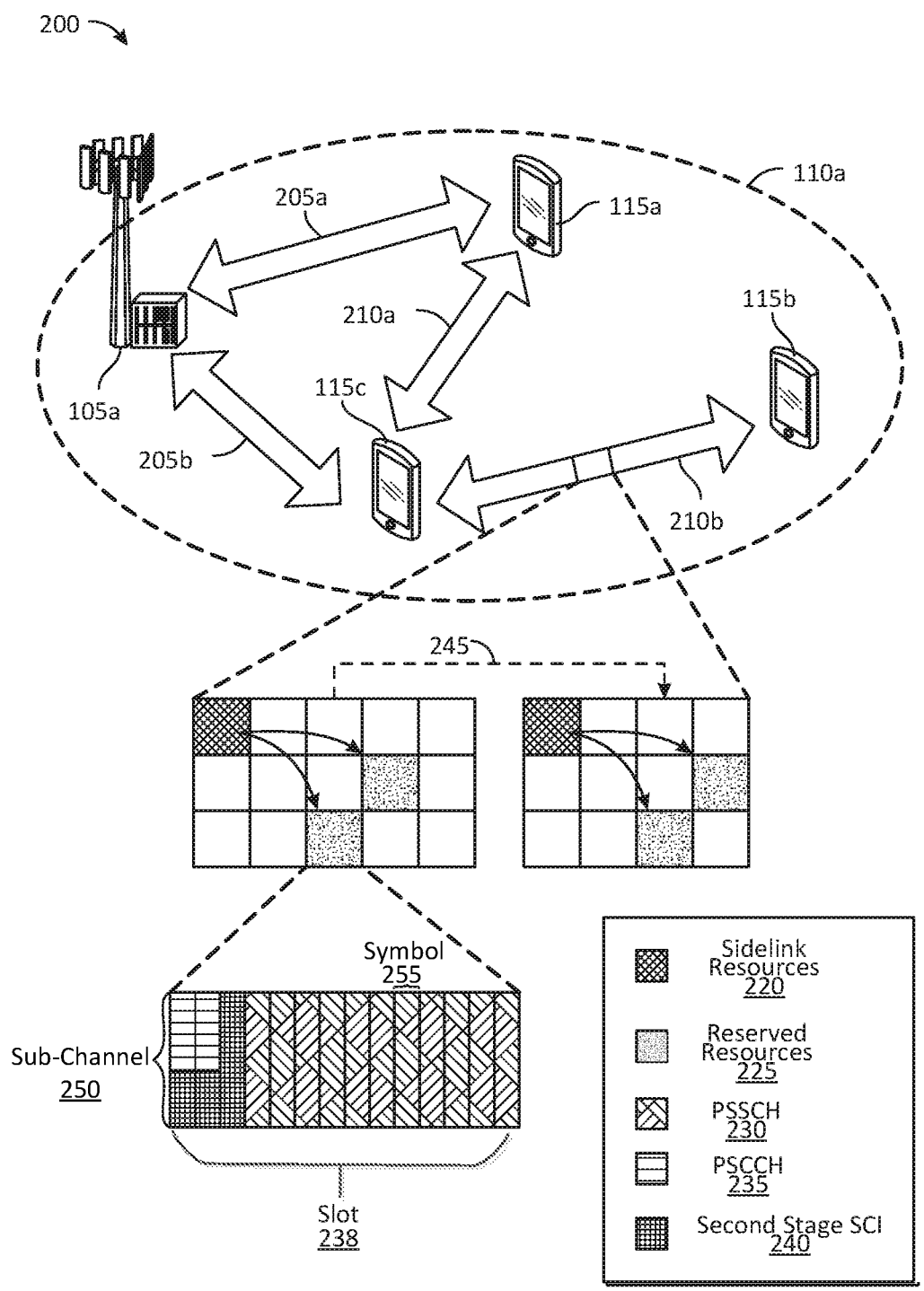
FIG. 2 illustrates sidelink resources associated with a wireless communication network according to some aspects of the present disclosure.

FIG. 2 illustrates sidelink resources associated with a wireless communication network 200 according to some aspects of the present disclosure. The wireless communications network 200 may include a base station 105a and UEs 115a, 115b, and 115c, which may be examples of a BS 105 and a UE 115 as described with reference to FIG. 1. Base station 105a and UEs 115a and 115c may communicate within geographic coverage area 110a and via communication links 205a and 205b, respectively. UE 115c may communicate with UEs 115a and 115b via sidelink communication links 210a and 210b, respectively. In some examples, UE 115c may transmit SCI to UEs 115a and 115b via the sidelink control resources 220. The SCI may include an indication of resources reserved for retransmissions by UE 115c (e.g., the reserved resources 225). In some examples, UEs 115a and 115b may determine to reuse one or more of the reserved resources 225.

In some aspects, a device in the wireless communication network 200 (e.g., a UE 115, a BS 105, or some other node) may convey SCI to another device (e.g., another UE 115, a BS 105, sidelink device or vehicle-to-everything (V2X) device, or other node). The SCI may be conveyed in one or more stages. The first stage SCI may be carried on the PSCCH while the second stage SCI may be carried on the corresponding PSSCH. For example, UE 115c may transmit a PSCCH/first stage SCI 235 (e.g., SCI-1) to each sidelink UE 115 in the network (e.g., UEs 115a and 115b) via the sidelink communication links 210. The PSCCH/first stage SCI-1 235 may indicate resources that are reserved by UE 115c for retransmissions (e.g., the SCI-1 may indicate the reserved resources 225 for retransmissions). Each sidelink UE 115 may decode the first stage SCI-1 to determine where the reserved resources 225 are located (e.g., to refrain from using resources that are reserved for another sidelink transmission and/or to reduce resource collision within the wireless communications network 200). Sidelink communication may include a mode 1 operation in which the UEs 115 are in a coverage area of BS 105a. In mode 1, the UEs 115 may receive a configured grant from the BS 105a that defines parameters for the UEs 115 to access the channel. Sidelink communication may also include a mode 2 operation in which the UEs 115 operate autonomously from the BS 105a and perform sensing of the channel to gain access to the channel. In some aspects, during mode 2 sidelink operations, the sidelink UEs 115 may perform channel sensing to locate resources reserved by other sidelink transmissions. The first stage SCI-1 may reduce the need for sensing each channel. For example, the first stage SCI-1 may include an explicit indication such that the UEs 115 may refrain from blindly decoding each channel. The first stage SCI-1 may be transmitted via the sidelink control resources 220. The sidelink control resources 220 may be configured resources (e.g., time resources or frequency resources) transmitted via a PSCCH 235. In some examples, the PSCCH 235 may be configured to occupy a number of physical resource blocks (PRBs) within a selected frequency. The frequency may include a single subchannel 250 (e.g., 10, 12, 15, 20, 25, or some other number of RBs within the subchannel 250). The time duration of the PSCCH 235 may be configured by the BS 105*a* (e.g., the PSCCH 235 may span 1, 2, 3, or some other number of symbols 255).

The first stage SCI-1 may include one or more fields to indicate a location of the reserved resources 225. For example, the first stage SCI-1 may include, without limitation, one or more fields to convey a frequency domain resource allocation (FDRA), a time domain resource allocation (TDRA), a resource reservation period 245 (e.g., a period for repeating the SCI transmission and the corresponding reserved resources 225), a modulation and coding scheme (MCS) for a second stage SCI-2 240, a beta offset value for the second stage SCI-2 240, a DMRS port (e.g., one bit indicating a number of data layers), a physical sidelink feedback channel (PSFCH) overhead indicator, a priority, one or more additional reserved bits, or a combination thereof. The beta offset may indicate the coding rate for transmitting the second stage SCI-2 240. The beta offset may indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18. In some examples, the FDRA may be a number of bits in the first stage SCI-1 that may indicate a number of slots and a number of subchannels reserved for the reserved resources 225 (e.g., a receiving UE 115 may determine a location of the reserved resources 225 based on the FDRA by using the subchannel 250 including the PSCCH 235 and first stage SCI-1 as a reference). The TDRA may be a number of bits in the first stage SCI-1 (e.g., 5 bits, 9 bits, or some other number of bits) that may indicate a number of time resources reserved for the reserved resources 225. In this regard, the first stage SCI-1 may indicate the reserved resources 225 to the one or more sidelink UEs 115 in the wireless communication network 200.

The sidelink UEs 115 may attempt to decode the reserved resources 225 indicated by the first stage SCI-1. In some aspects, the reserved resources 225 may be used for retransmission of sidelink data or the first stage SCI-1. Additionally or alternatively, the reserved resources 225 may include resources for sidelink transmissions, such as a PSSCH 230. As will be described in detail below with reference to FIGS. 3-5, the slot 238 may be partitioned into multiple sub-slots. The sub-slots may be transmitted via PSSCH 230 using one or more symbols 255. In some examples, the PSSCH 230 may be transmitted via one or more time or frequency resources via one or more full or partial symbols 255. A second stage SCI-2 240 may be transmitted via one or more symbols 255 of the PSSCH 230. The second stage SCI-2 240 may be transmitted in a symbol(s) near or at the beginning of a slot. The second stage SCI-2 240 may include an indication of which of the reserved resources 225 the transmitting UE 115 may use for sidelink transmissions. The second stage SCI-2 240 may thereby be received and decoded by sidelink UEs 115 intended to receive and decode the corresponding sidelink communications.

In some aspects, the transmitting UE 115 may transmit first-stage SCI-1 to one or more receiving UEs 115 indicating whether multiple sub-slots are enabled or disabled for the slot 238. In this regard, the transmitting UE 115 may transmit the SCI-1 over the PSCCH 235. The UE 115 may transmit the SCI-1 indicating a sub-slot configuration in the time and/or frequency domain for the multiple sub-slots. The UE 115 may transmit a PSCCH 235 communication that includes SCI-1 control information applicable to all of the sub-slots in the slot. Additionally or alternatively, the UE 115 may transmit a PSCCH 235 communication that includes SCI-1 control information applicable to one or more sub-slots and/or a subset of the sub-slots in the slot 238.

The UE 115 may transmit, to at least one other UE 115, a transport block (TB) via a sub-PSSCH of a sub-slot of the slot 238. In some instances, the UE 115 may gain access to the wireless channel in unlicensed spectrum by performing an LBT/CCA. The UE 115 may transmit the TB based on a successful CCA. The UE 115 may retain the channel during a subsequent slot 238 without performing another CCA. For example, the UE 115 may transmit a TB via a sub-PSSCH in the sub-slot of the slot 238 and transmit another TB via a PSSCH in the subsequent slot 238 without performing another CCA. In this manner, the UE 115 may increase the utilization of time/frequency resources of the wireless network 200 as compared to transmitting the TB in the slot 238 by performing another successful CCA.

In some aspects, the BS 105*a* may transmit, to the UE 115, a configuration indicating a plurality of sub-slots within the slot 238. The configuration may include, without limitation, resources associated with the sub-slot of a plurality of sub-slots in slot 238, a starting subchannel index associated with the sub-slot, a number of subchannels associated with the sub-slot, a modulation and coding scheme associated with the sub-slot, a beta offset associated with the sub-slot, or a search space period associated with the plurality of sub-slots. In this regard, the BS 105*a* may transmit the configuration in an RRC configuration message, a DCI message, and/or a MAC control element signaling via a physical downlink shared channel (PDSCH), a physical downlink control channel (PDCCH), or other suitable channel. The configuration transmitted by the BS 105*a* may be received by the UE 115 and used by the UE 115 to partition the slot 238 into sub-slots, map the sub-PSSCHs, SCI, and AGC symbols to the sub-slots, configure the SCI-1, and/or configure the SCI-2. In some aspects, the UE 115 may receive, from BS 105*a*, an instruction that instructs the UE 115 to receive a second TB via a PSSCH associated with a subsequent slot 238.

Figure 3:
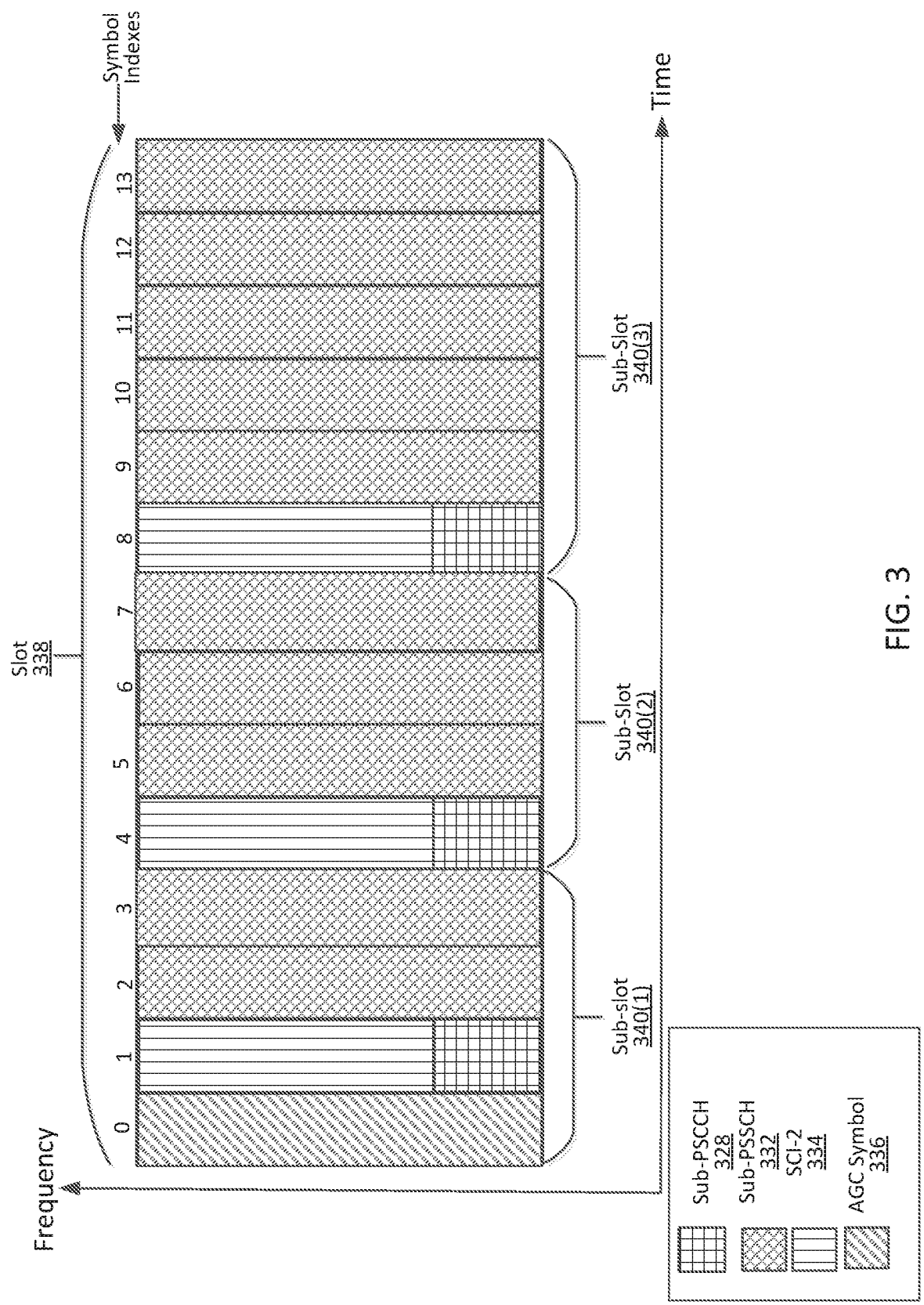
FIG. 3 illustrates a slot partitioned into sub-slots according to some aspects of the present disclosure.

FIG. 3 illustrates a slot 338 partitioned into sub-slots 340 according to some aspects of the present disclosure. In FIG. 3, the x-axis represents time in some arbitrary units and the Y-axis represents frequency in some arbitrary units. In some aspects, the UE (e.g., the UE 115, the UE 700) may map a sub-PSSCH 332, an SCI 334, and an AGC symbol 336 to any or all of the sub-slots 340 in a slot 338. The UE 115 may map multiple sub-PSSCHs 332, SCIs 334, and AGC symbols 336 to multiple sub-slots 340 within the slot 338. In some instances, each of the sub-PSSCHs 332, SCIs 334, and AGC symbols 336 mapped in the sub-slot 340 may be used by the UE 115 to transmit TBs to different UEs 115 over a sidelink channel in an unlicensed spectrum. In this manner, the UE 115 may increase the utilization of time/frequency resources within the slot 338 as compared to the UE 115 transmitting the TB to a single UE 115 in the slot 338.

By partitioning the slot 338 into the plurality of sub-slots 340, each sub-slot 340(1) . . . 340(3) may be utilized by the UE 115 to transmit a TB, facilitating the transmission of multiple TBs by the UE 115 in a single slot 338. In some instances, the UE 115 may receive a sub-slot partitioning configuration from a BS (e.g., the BS 105 or BS 800). The UE 115 may receive a resource pool (RP) configuration from the BS 105 that defines the RP for the sub-slots 340. In this regard, the UE 115 may receive the sub-slot 340 and/or RP configurations in an RRC message and/or a DCI message (e.g., a DCI-3 signal, DCI-1 signal). The UE 115 may partition the slot 338 into a plurality of sub-slots 340 based on the sub-slot configuration and/or the RP configuration. The UE 115 may transmit the sub-slot structure to other UEs 115 (e.g., receiving UEs 115). In some instances, the UE 115 communicates the sub-slot structure to the other UEs 115 in SCI. In some aspects, the UE 115 may gain access to the channel based on a successful CCA and transmit a TB in a leading sub-slot 340(1) (e.g., the earliest sub-slot in time) of the plurality of sub-slots 340 defined for the slot 338. The UE 115 may transmit the SCI including the sub-slot structure to the other UEs 115 in the leading sub-slot 340(1).

In some aspects, the UE 115 may partition the slot 338 such that each sub-slot 340 occupies multiple symbols within the slot 338. For example, a slot 338 may include 2, 3, 4, or more sub-slots. In some instances, a slot may include 14 symbols. A sub-slot 340 may occupy 2, 3, 4, 5, 6, or more symbols. In some aspects, each sub-slot 340 may occupy contiguous symbols within the slot 338. In this regard, each sub-slot 340 may occupy groups of symbols that are contiguous in time. The group of contiguous symbols may include any number of symbols contained within the slot 338. Referring to FIG. 3, the sub-slot 340(1) may occupy symbol indexes 0-3. The sub-slot 340(2) may occupy symbol indexes 4-7. The sub-slot 340(3) may occupy symbol indexes 8-13, or any other group of contiguous symbols within the slot 338. The number of symbols occupying the sub-slot 338 may be based on the size of the TB to be transmitted. A larger TB may require more symbols than a smaller TB. In some aspects, the number of sub-slots 340 in the slot 338 may be based on when the UE 115 gains the channel after a successful CCA. For example, if the UE 115 gains the channel during symbol 3, the UE 115 may partition subsequent symbols 4-13 into sub-slots 340(2) and 340(3) in the slot 338. If the UE 115 gains the channel during symbol 7, the UE may partition subsequent symbols 8-13 into sub-slot 340(3) in the slot 338.

In some aspects, the UE 115 may map an AGC symbol 336 to each sub-slot 340 of the slot 338. Another UE 115 may receive a TB from the UE 115 in a sub-PSSCH 332 whose signal strength may vary over a wide dynamic range depending on channel attenuation, interference, and/or other conditions. The AGC symbol 336 may be used to adjust the strength of the received signal in order to reduce the quantization error at the analog-to-digital converter of the receiving UE 115. In some instances, the AGC symbol 336 may help a receiving UE 115 adjust the gain of a front-end amplifier of a receiver. In some aspects, the UE 115 may map the AGC symbol 336 to the leading (e.g., the earliest in time) symbol 0 in the earliest sub-slot 340(1) of the plurality of sub-slots 340(1) . . . 340(3) in the slot 338. The UE 115 may map the AGC symbol 336 to the leading symbol 0 in order for a receiving UE 115 to set the gain of the amplifier and successfully decode the subsequent symbols of the sub-slot 340. In some aspects, the UE 115 may map the AGC symbol 336 to only the leading symbol 0 of the leading sub-slot 340(1) and refrain from mapping the AGC symbol 336 to the non-leading sub-slots 340(2) and 340(3) in order for the receiving UEs 115 to set the gain of an amplifier based on the AGC symbol 336 in the leading sub-slot 340(1) and successfully decode the subsequent symbols of the subsequent sub-slots 340(2) and 340(3). In some aspects, omitting the AGC symbol 336 in the non-leading sub-slots 340(2) and 340(3) (e.g., the subsequent sub-slots) may enable the UE 115 to map an additional symbol to a sub-PSSCH 332 in the non-leading sub-slots 340(2) and 340(3), enabling larger TBs to be transmitted in the non-leading sub-slots 340(2) and 340(3).

In some aspects, the UE 115 may map a sub-PSSCH 332 to each sub-slot 340 of the slot 338. Each sub-PSSCH 332 of each sub-slot 340 may occupy one or more symbols. The sub-PSSCHs 332 may carry one or more transport blocks (TBs) that include the data to be communicated by a transmitting UE 115. The number of symbols the sub-PSSCH 332 occupies may be based on the size of the TB. As described above, in accordance with the present disclosure, each sub-slot 340 may be utilized by the UE 115 to transmit the TB(s).

In some aspects, the UE 115 may map a gap symbol (e.g., a guard period) to the last symbol 13 of the last sub-slot 340(3) of the plurality of sub-slots 340(1) . . . 340(3). The gap symbol may be used by UEs for timing adjustments and/or switching between transmitting and receiving. Additionally or alternatively, the UE 115 may refrain from mapping a gap symbol in the last symbol (e.g., symbol index 13) of the last sub-slot 340(3) of the plurality of sub-slots 340(1) . . . 340(3). Instead of mapping the gap symbol in the last symbol of the last sub-slot 340(3) of the plurality of sub-slots, the UE 115 may map a sub-PSSCH 332 to the last symbol 13 of the last sub-slot 340(3) of the plurality of sub-slots 340(1) . . . 340(3). A gap symbol may be a time period in which the UE 115 refrains from transmitting. When the UE 115 refrains from transmitting during the gap symbol, another wireless device (e.g., another UE 115, a BS 105, a WiFi device, etc.) may perform an LBT/CCA and sense the channel is not occupied. The other wireless device may gain the channel based on a successful CCA. To prevent another device from gaining the channel, the UE 115 may refrain from mapping a gap symbol in the last sub-slot 340(3) of the slot 338 and instead transmit a TB in a sub-PSSCH 332 in the last sub-slot 340(3) of the slot 338. The TB transmitted in the last sub-slot 340(3) may include data and/or padding. By occupying the channel with the sub-PSSCH 332, the UE 115 may prevent another device from gaining access to the channel and allow the UE 115 to retain use of the channel for the next slot 338.

In some aspects, the UE 115 may map an SCI to each sub-slot 340 of the slot 338. Splitting the SCI in two stages (first-stage SCI-1 and second-stage SCI-2) may allow UEs 115 to decode the first-stage SCI-1 for channel sensing purposes, such as determining the resources reserved by other transmissions. The second-stage SCI-2 may provide additional control information that allows the UE 115 to receive and decode a transmission. In this regard, the UE 115 may transmit the SCI-1 to another UE 115 in a physical sidelink control channel (PSCCH). Referring to FIG. 3, the UE 115 may transmit the sub-slot structure to other UEs 115 in the sub-PSCCHs 328. The SCI-1 carried by the sub-PSCCH 328 may include a beta offset associated with an SCI-2 carried by sub-PSSCH 332. The SCI-1 may include a modulation and encoding scheme (MCS) of the sub-PSSCH 332. The SCI-1 may include resource assignments for at least one sub-slot 340 of the plurality of sub-slots 340(1) . . . 340(3) of a slot 338 and/or resource assignments for at least one sub-slot 340 of another slot (e.g., a future slot). The resource assignments for the current slot 338 or for a future slot may be used by transmitting UE(s) 115 for retransmissions of TB(s) that are not successfully decoded by receiving UE(s) 115. The UEs 115 may be operating in a sidelink mode 1 in which the UE 115 receives the resource assignments from a serving BS (e.g., the BS 105 or BS 800). The UE 115 may transmit the resource assignments to the following UEs 115 in the SCI-1 carried by the sub-PSCCHs 328.

In some aspects, the UE 115 may transmit the SCI-2 334 to another UE 115 in a sub-PSSCH 332. The SCI-2 334 may include information used for decoding the sub-PSSCH 332 and for supporting HARQ feedback. The SCI-2 334 may include a UE 115 source ID and a UE 115 destination ID associated with a TB. The SCI-2 may also include a one-bit new data indicator (NDI) that is used to specify whether the TB sent in the sub-PSSCH 332 corresponds to the transmission of new data or a retransmission.

In some aspects, the UE 115 may transmit a sub-PSSCH 332 in a sub-slot 340 that includes at least one demodulation reference signal (DMRS). The UE 115 may receive a configuration from the BS 104 that includes a search space period associated with the plurality of sub-slots 340(1) . . . 340(3). In some aspects, the UE 115 may perform blind decoding on the second stage SCI-2 334 in the sub-PSSCH 332 of the sub-slot 340 based on the search space period. The UE 115 may monitor for the DMRS. The DMRS may be a reference signal used by the receiving UE 115 for channel estimation and/or compensating for Doppler effects. The DMRS may be included in at least one sub-slot 340 of the plurality of sub-slots 340(1) . . . 340(3) of the slot 338. In this regard, the DMRS may be located anywhere within the sub-slot 340. For example, the DMRS may be located in the first symbol of the sub-slot 340, the last symbol of the sub-slot 340, or an intermediate symbol of the sub-slot 340. In some aspects, the DMRS may include all resource elements (REs) within the symbol. In some aspects, the DMRS may include a portion of the REs within the symbol. For example, the DMRS may include a portion of the REs within the same symbol that occupies the second stage SCI-2 334. The receiving UE 115 may perform blind decoding on the second stage SCI-2 334 in the sub-PSSCH 332 of the sub-slot 340 based on the DMRS. For example, if the receiving UE 115 successfully detects a DMRS, the receiving UE 115 may perform blind decoding on the second stage SCI-2 334. If the receiving UE 115 does not successfully detect a DMRS, the receiving UE 115 may refrain from performing blind decoding on the second stage SCI-2 334. In this regard, the receiving UE 115 may conserve power consumption by refraining from performing blind decoding on the second stage SCI-2 334. In some aspects, a longer search space period may reduce the frequency of performing blind decoding on the second stage SCI-2 334 and therefore reduce power consumption in the receiving UE 115 as compared to a shorter search space period that may increase the frequency of blind decoding.

Figure 4:
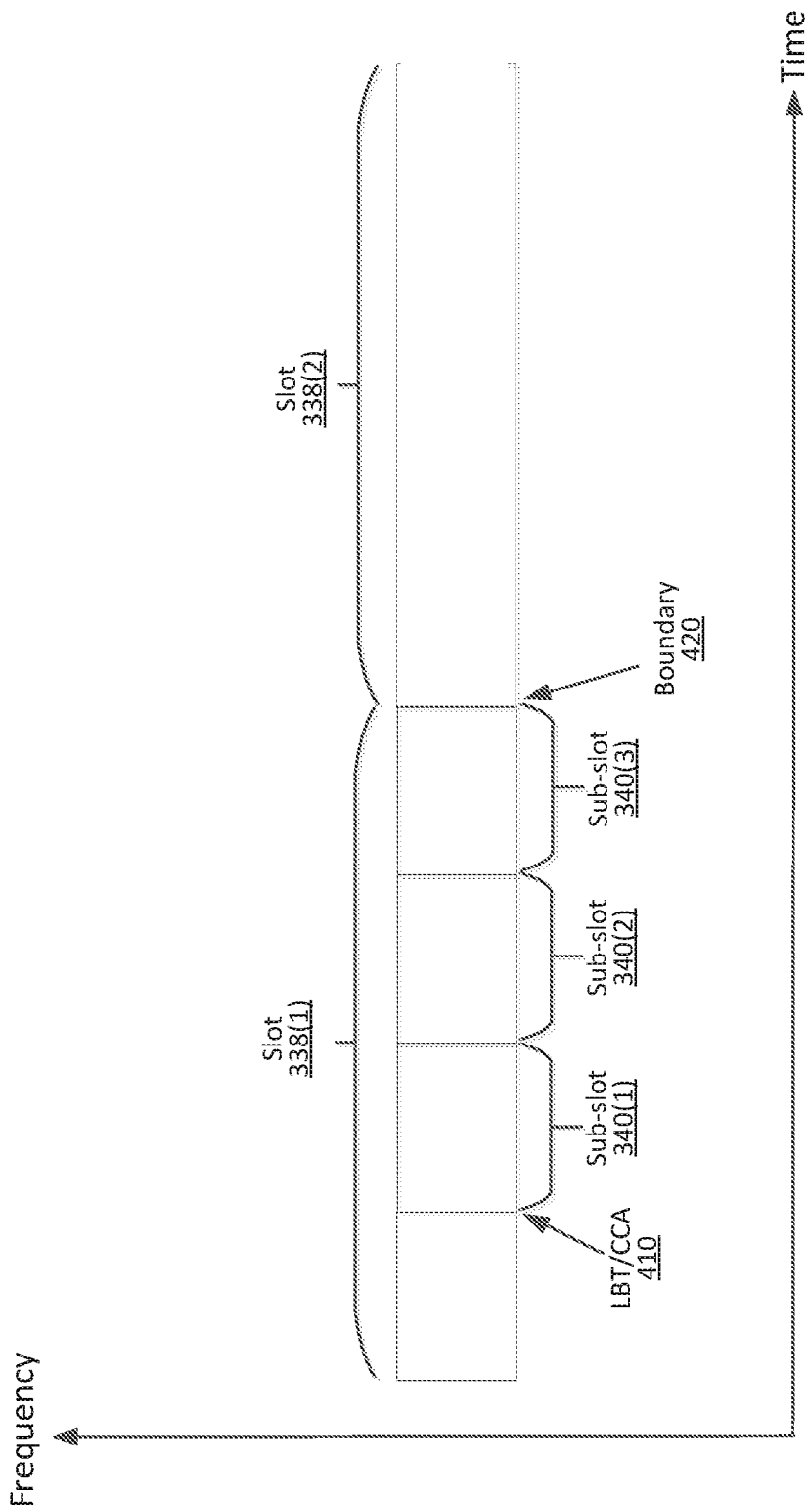
FIG. 4 illustrates sub-slot partitioning of a current slot and a subsequent slot according to some aspects of the present disclosure.

FIG. 4 illustrates sub-slot 340 partitioning of a current slot 338(1) and a subsequent slot 338(2) according to some aspects of the present disclosure. In FIG. 4, the x-axis represents time in some arbitrary units and the Y-axis represents frequency in some arbitrary units. The UE (e.g., the UE 115, the UE 700) may map sub-slots 340(1) . . . 340(3) in a slot 338. The UE 115 may perform an LBT/CCA 410 during slot 338(1). In some aspects, the UE 115 may communicate over an unlicensed spectrum. One issue of operating in an unlicensed spectrum is to ensure coexistence with other unlicensed systems (e.g., Wi-Fi). In some instances, the UE 115 may operate in a manner that limits the impact on other devices operating in the same unlicensed band. For example, in some aspects, standards regulations may mandate the use of listen-before-talk (LBT) protocols. LBT is a spectrum sharing mechanism by which a device senses the spectrum band using a clear channel assessment (CCA) check before accessing the channel. The UE 115 may first sense the communications channel at LBT/CCA 410 during slot 338(1) to determine if there are other devices using the channel prior to any transmission by the UE 115. In some aspects, the channel sensing procedure may rely on detecting energy levels on one or multiple sub-bands of the frequency band.

The LBT parameters (e.g., type of LBT (e.g., a frame-based equipment (FBE)-based LBT and/or a load-based equipment (LBE)-based LBT), category of LBT (e.g., CAT2-LBT and/or CAT4-LBT), duration of sensing, CCA parameters, etc.) may be determined and/or configured by the BS 105. For example, the CCA parameters may include a back-off time period after an unsuccessful LBT, a contention window size, the energy detection threshold, discovery reference signal timing etc. In some instances, the UE 115 may receive one or more LBT parameters from the BS 105. The UE 115 may receive the one or more LBT parameters via a radio resource control (RRC) message and/or a downlink control information (DCI) message (e.g., a unicast DCI3 message and/or a groupcast DCI3 message). The UE 115 may perform an FBE-based LBT and/or an LBE-based LBT. In the FBE-based LBT, channel sensing may be performed at predetermined times. For instance, if the channel is sensed to be busy, the UE 115 may wait for a predetermined time period and sense the channel again after the predetermined time period. In the LBE-based LBT, channel sensing may be performed at any time instant and a random waiting time period may be used if the channel is sensed to be busy. In some aspects, the UE 115 may perform a successful LBT/CCA 410 by sensing the energy in the channel and determining the sensed energy is below a CCA threshold. If the energy level in the channel is below the CCA threshold, then the UE 115 may transmit for a duration, which may be referred to as a channel occupancy time (COT). Sidelink communication may include a mode 1 operation in which the UE 115 is in a coverage area of the BS 105. In mode 1 operation, the UE 115 may receive the LBT parameters from the BS 105 that defines the parameters for the UE 115 to access the channel. Sidelink communication may also include a mode 2 operation in which the UE 115 operates autonomously from the BS 105 and performs LBT/CCA sensing of the channel to gain access to the channel. In some aspects the UE 115 operating in mode 1 may receive the LBT parameters from the BS 105 and transmit the parameters to another UE 115 operating in mode 2. As described below, the UE 115 may transmit in a sub-slot 340 based on a successful LBT/CCA 410. The UE 115 may also transmit in a slot 338(2) after the sub-slot 340 without performing another LBT/CCA 410.

In some aspects, the UE 115 may transmit, to another UE (e.g., the UE 115 or the UE 700) based on the LBT/CCA 410 being successful, a TB via a first sub-PSSCH associated with the first sub-slot 340(1) of the slot 338(1). The UE 115 may transmit the TB to another UE 115 within sidelink communication range of the UE 115. The UE 115 may gain access to the channel based on a successful LBT/CCA 410 and transmit the TB in the sub-slot 340(1) of the plurality of sub-slots 340(1) . . . 340(3) within the slot 338(1). In some aspects, the UE 115 may transmit a TB in each sub-slot 340(1), 340(2), and 340(3), of the plurality of sub-slots 340(1) . . . 340(3) within the slot 338(1). The UE 115 may transmit a TB in each sub-slot 340(1), 340(2), and 340(3) to one and/or multiple different UEs 115. Accordingly, the UE 115 may transmit multiple TBs to a single UE 115 and/or transmit different TBs to different UEs 115 via the plurality of sub-slots 340(1) . . . 340(3) within the slot 338(1).

In some aspects, the UE 115 may transmit padding in at least one sub-slot 340 of the plurality of sub-slots 340(1) . . . 340(3). For example, the UE 115 may transmit a TB that includes padding in at least one sub-slot 340. The padding may include random data. The padding may be transmitted by the UE 115 without a particular UE 115 destination ID. In some aspects, the padding may be transmitted in at least one sub-slot 340 (e.g., the last sub-slot 340(3) of the plurality of sub-slots 340(1) . . . 340(3)) in order to reduce the probability of a successful LBT/CCA by another UE 115. Reducing the probability of a successful CCA by another UE 115 may enable the UE 115 to maintain access to the channel. For example, in some instances, the UE 115 may transmit a TB in the leading sub-slot 340(1) and transmit padding in one or more subsequent sub-slots 340(2) and/or 340(3) up to a slot boundary 420 between the last sub-slot 340(3) of the current slot 338(1) and a subsequent slot 338(2). This may allow the UE 115 to maintain access to the channel for the subsequent slot 338(2).

In some aspects, a subsequent slot 338(2) may follow the current slot 338(1) having the plurality of sub-slots 340. The subsequent slot 338(2) may immediately follow the plurality of sub-slots 340 in time. The sub-slot 340(3) may be adjacent to the slot 338(2). In this regard, the sub-slot 340(3) may border a slot boundary 420 and the subsequent slot 338(2) may border the same slot boundary 420 (e.g., the slot boundary 420 between the current slot 338(1) and the immediately subsequent slot 338(2)). In some aspects, the UE 115 may gain the channel during a sub-slot 340 of the current slot 338(1) and retain the channel across the slot boundary 420 into the adjacent subsequent slot 338(2). In some instances, the UE 115 may retain the channel during the subsequent slot 338(2) without performing another LBT/CCA 410. In some aspects, the UE 115 may transmit another TB via a PSSCH in the subsequent slot 338(2) without performing another LBT/CCA 410. By the UE 115 transmitting at least one TB within at least one sub-slot 340 of the current slot 338(1) followed by transmitting another TB in the adjacent slot 338(2) without performing another LBT/CCA 410, the UE 115 may increase the capacity of the wireless network and/or reduce UE 115 power consumption as compared to performing an additional LBT/CCA 410 in order to transmit another TB in the adjacent slot 338(2).

Figure 5:
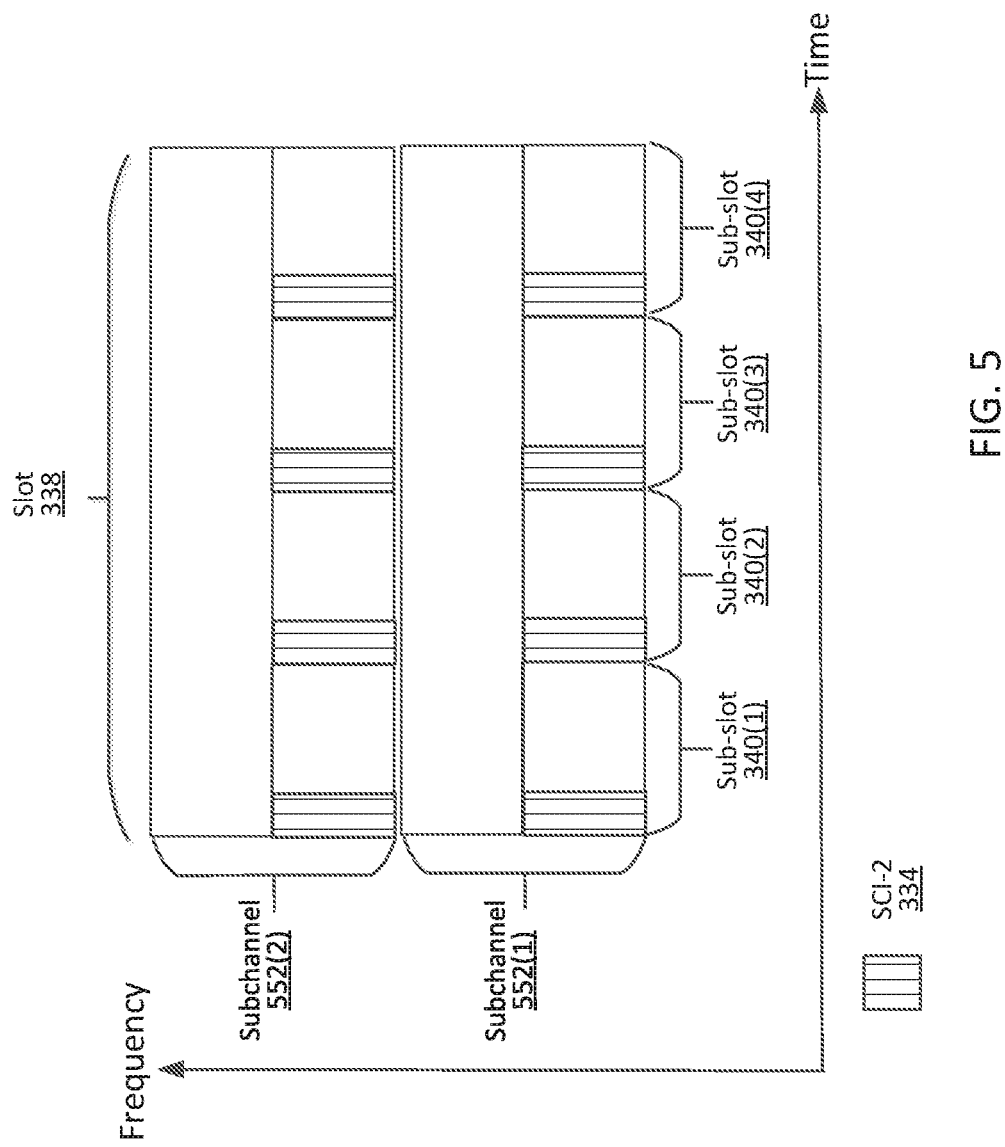
FIG. 5 illustrates sub-slot partitioning across multiple subchannels according to some aspects of the present disclosure.

FIG. 5 illustrates sub-slot 340 partitioning across multiple subchannels 552 according to some aspects of the present disclosure. In FIG. 5, the x-axis represents time in some arbitrary units and the Y-axis represents frequency in some arbitrary units. In some aspects, the UE 115 may receive, from a BS (e.g., BS 105 or BS 800), a configured grant (CG) associated with a resource allocation for a plurality of sub-slots 340(1) . . . 340(4). In this regard, the UE 115 may operate in sidelink mode 1 and receive the CG from the BS 105 in an RRC message and/or a DCI message (e.g., a unicast DCI3 message and/or a groupcast DCI3 message).

The configured grant may indicate the resources/parameters for configuring the sub-slots 340 of the plurality of sub-slots 340(1) . . . 340(4) of the slot 338. In this regard, the CG may include a search space configuration and/or resources/parameters associated with a second stage SCI-2 334, sub-PSSCHs, and/or other aspects of the sub-slots 340. The CG may indicate the time resources and/or frequency resources associated with the plurality of sub-slots 340. In this regard, the CG may indicate a starting subchannel index associated with the plurality of sub-slots 340. The starting subchannel index may indicate a starting frequency resource associated with the plurality of sub-slots 340. The CG may include a number of subchannels 552(1) and 552(2) associated with the plurality of sub-slots 340(1) . . . 340(4). In some instances, the UE 115 may utilize one or more of the subchannels 552 associated with the plurality of sub-slots 340(1) . . . 340(4) to transmit one or more TBs. For example, the UE 115 may transmit a first TB in a first subchannel 552(1) and transmit a second TB in a second subchannel 552(2), different from the first subchannel 552(1). In some aspects, the UE 115 may transmit different TBs to different UEs 115 in different subchannels 552. The subchannels 552 may include frequencies or frequency ranges that include one or more resource elements, subcarriers, subbands, channels, bands, etc.

In some instances, the CG may indicate a search space period associated with the plurality of sub-slots 340(1) . . . 340(4). In some aspects, a receiving UE 115 may perform blind decoding on a second stage SCI-2 334 in the sub-PSSCH of the sub-slot 340 based on the search space period. In some aspects, the UE 115 may map the sub-PSSCH, the AGC, and/or the second-stage SCI-2 334 to each sub-slot 340 of the plurality of sub-slots 340(1) . . . 340(4) based on the parameters received in the CG.

In some aspects, the UE 115 may receive a sub-slot resource pool (RP) and a slot RP configuration indicating a plurality of subchannels 552 in an unlicensed subband. In this regard, the UE 115 may receive a sub-slot RP and a slot RP that indicates a subchannel 552 size for frequencies in an unlicensed frequency spectrum (e.g., an industrial, scientific and medical (ISM) frequency band). In this regard, the unlicensed spectrum may include a 2400 MHz to 2500 MHz band, a 5180 MHz to 5875 MHz band, or any other unlicensed frequency band. The subchannel 552 size may include any range of frequencies. For example, the subchannel 552 size may include, without limitation, a 5 MHz band of frequencies, a 10 MHz band of frequencies, a 20 MHz band of frequencies, etc. The UE 115 may transmit TBs in one or more subchannels 552 of the plurality of subchannels 552(1) . . . 552(2) in the unlicensed band.

Figure 6:
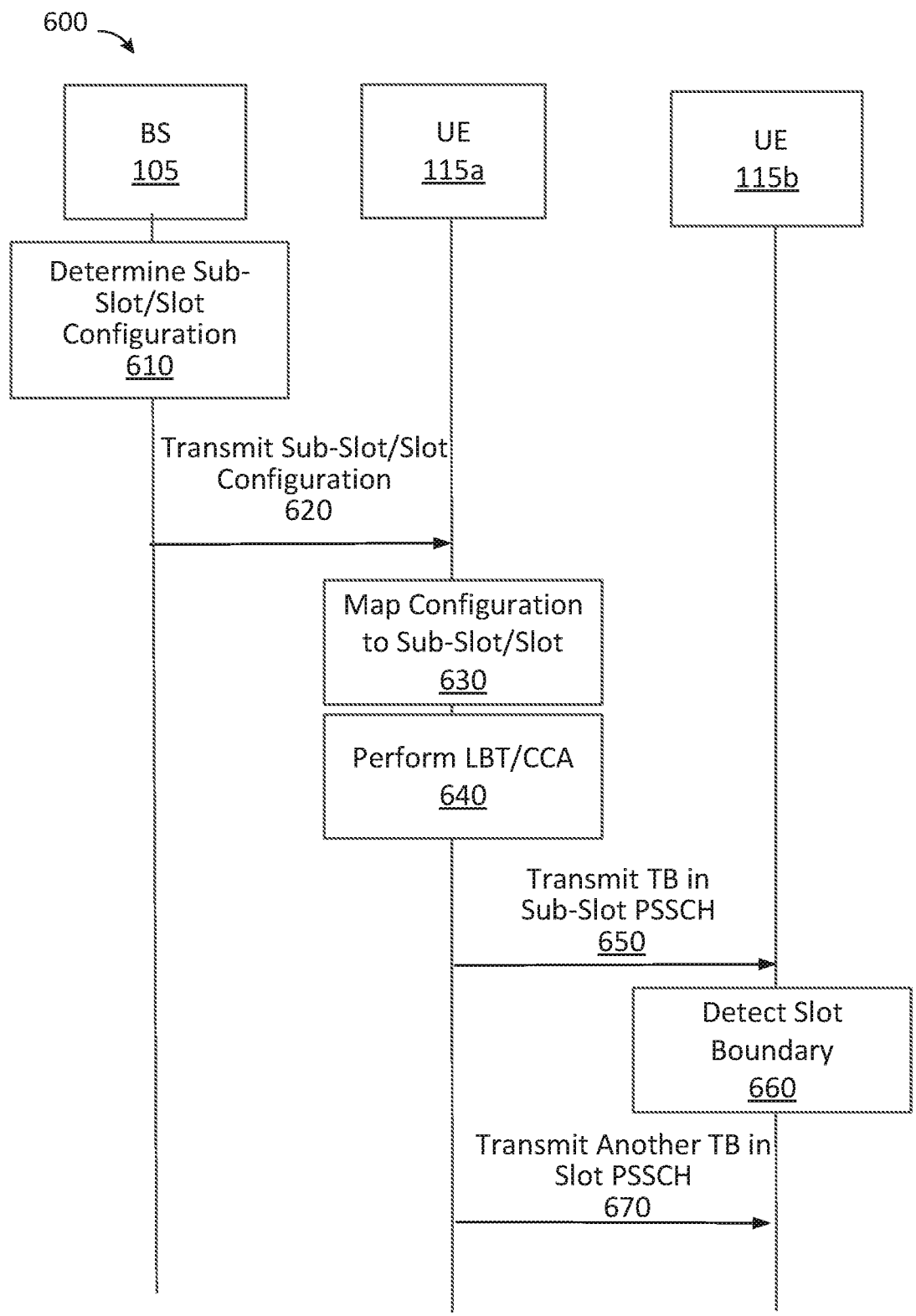
FIG. 6 is a signaling diagram of a communication method according to some aspects of the present disclosure.

FIG. 6 is a signaling diagram of a communication method according to some aspects of the present disclosure. Steps of the signaling diagram 600 can be executed by a computing device (e.g., a processor, processing circuit, and/or other suitable component) of a communication device or other suitable means for performing the steps. For example, a communication device, such as the BS 105 or the BS 800, may utilize one or more components, such as a processor 802, a memory 804, instructions 806, a sub-slot/slot mapping module 808, a transceiver 810, a modem 812, an RF unit 814, and one or more antennas 816 to execute the steps of method signaling diagram 600. A wireless communication device, such as the UE 115 or UE 700, may utilize one or more components, such as the processor 702, the memory 704, the sub-slot/slot mapping module 708, the transceiver 710, the modem 712, and the one or more antennas 716, to execute signaling diagram 600.

At 610, a BS 105 may determine a sub-slot/slot configuration. The BS 105 may operate in sidelink mode 1 and communicate the sub-slot/slot configuration to the UE 115. The sub-slot/slot configuration may include LBT parameters that defines the parameters for the UE 115 to access the channel. For example, the BS may configure the time resources and/or frequency resources associated with the sub-slots including a sub-slot RP and/or a slot RP. The configuration may further include a starting subchannel index associated with the sub-slot and a number of subchannels associated with the sub-slot. The configuration may include a modulation and coding scheme for decoding a second-stage SCI-2 and/or the sub-PSSCH of the sub-slot. The configuration may include a search space period associated with the plurality of sub-slots.

At 620, the BS 105 may transmit the configuration to UE 115*a*. In this regard, the BS 105 may transmit the sub-slot/slot configuration in an RRC configuration message, a DCI message, and/or a MAC control element signaling via a physical downlink shared channel (PDSCH), a physical downlink control channel (PDCCH), or other suitable channel to the UE 115*a*.

At 630, the UE 115*a* may map the configuration to a current slot and a subsequent slot. In some aspects, the UE may map the configuration to a series of slots as described above with reference to FIGS. 3 and 4. The UE 115*a* may map a sub-PSSCH, an SCI, and an AGC symbol to any or all of the sub-slots in the current slot. The UE 115 may map a PSSCH, an SCI, an AGC symbol, and a gap symbol to the subsequent slot.

At 640, the UE 115*a* may perform an LBT/CCA in the channel defined by the configuration transmitted by the BS at 620. In some instances, the UE 115*a* may gain access to the wireless channel by performing a successful LBT/CCA as described above with reference to FIGS. 3 and 4.

At 650 the UE 115*a* may transmit a TB to the UE 115*b* in a sub-PSSCH associated with a sub-slot of the current slot. The UE 115*a* may transmit the TB based on the successful CCA at 640. The UE 115*a* may retain the channel during the subsequent slot without performing another CCA. In some aspects, the UE 115*a* may transmit padding in at least one sub-slot of the current slot. For example, the UE 115*a* may transmit a TB that includes padding in at least one sub-slot. In some aspects, the padding may be transmitted in the last sub-slot(s) of the current slot in order to reduce the probability of a successful LBT/CCA by another wireless device. Reducing the probability of a successful CCA by another device may enable the UE 115*a* to maintain access to the channel in the subsequent slot.

At 660, the UE 115*b* may detect a slot boundary. In this regard, the UE 115*b* may detect a boundary between the sub-slot of the current slot and the subsequent slot. The UE may detect the boundary between the sub-slot of the current slot and the subsequent slot using any method. In this regard, the UE 115*b* may detect the boundary between the sub-slot of the current slot and the subsequent slot by detecting a resource associated with the subsequent slot. For example, the UE 115*b* may detect a DMRS, an SCI-1, an SCI-2, a PSCCH, a PSSCH, or a combination thereof associated with the subsequent slot. Additionally or alternatively, the UE 115*b* may receive, from the UE 115*a*, an instruction in a sub-PSSCH that instructs the UE 115*b* to receive another TB via the PSSCH associated with the subsequent slot. In this regard, the UE 115*b* may receive an instruction from the UE 115*a* in a sub-PSSCH that indicates timing of the slot boundary. For example, the instruction may include a timing offset that indicates the relative timing of the slot boundary. The timing offset may be relative to a symbol of the current slot or the subsequent slot, a sub-slot of the current slot, a previous slot, a frame, etc. The UE 115*b* may receive another TB from the UE 115*a* based on the received instruction. In some aspects, the UE 115*b* may detect the slot boundary and switch from monitoring the sub-slot RP to monitoring the slot RP. In some aspects, when monitoring the slot RP, the UE 115*b* may not detect the DMRS and/or successfully decode the SCI-1 or PSSCH. In this case, the UE 115*b* may resume monitoring the sub-slot RP after a preconfigured time period.

At 670, the UE 115*a* may transmit another TB in a slot PSSCH. In some instances, the UE 115*b* may retain the channel during the subsequent slot without performing another CCA. For example, at 650 the UE 115*a* may transmit a first TB via a sub-PSSCH in the sub-slot and at 670 transmit a second TB via a PSSCH in the subsequent slot without performing another CCA. By the UE 115*a* transmitting a TB within a sub-slot of the current slot followed by transmitting another TB in an adjacent slot without performing another CCA, the UE 115*a* may increase the capacity of the wireless network and/or reduce UE 115*a* power consumption as compared to performing an additional CCA in order to transmit another TB in the adjacent slot.

Figure 7:
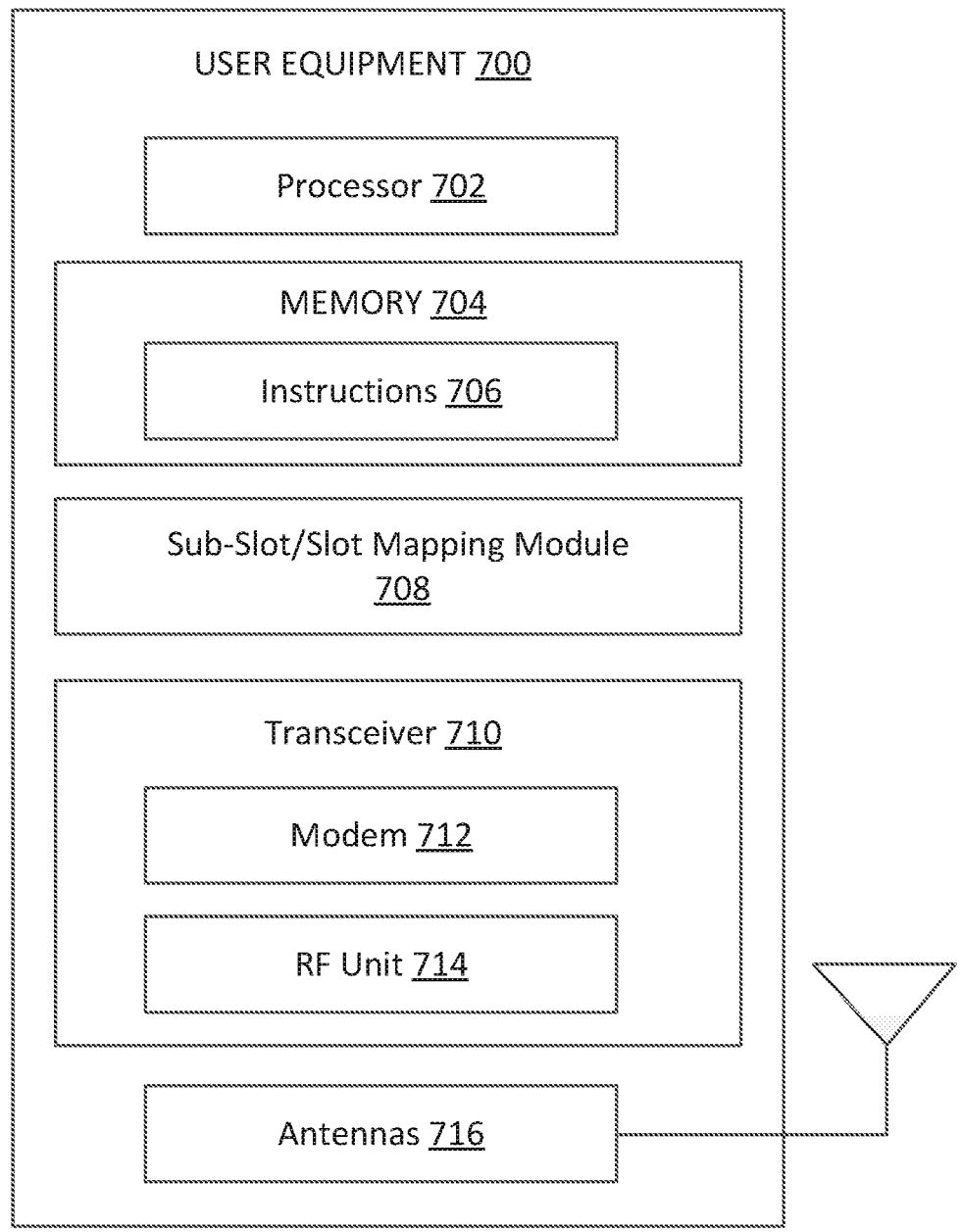
FIG. 7 is a block diagram of an exemplary user equipment (UE) according to some aspects of the present disclosure.

FIG. 7 is a block diagram of an exemplary UE 700 according to some aspects of the present disclosure. The UE 700 may be the UE 115 in the network 100 as discussed above. As shown, the UE 700 may include a processor 702, a memory 704, a sub-slot/slot mapping module 708, a transceiver 710 including a modem subsystem 712 and a radio frequency (RF) unit 714, and one or more antennas 716. These elements may be coupled with each other and in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with aspects of the present disclosure, for example, aspects of FIGS. 2-7 and 10-11. Instructions 706 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sub-slot/slot mapping module 708 may be implemented via hardware, software, or combinations thereof. For example, the sub-slot/slot mapping module 708 may be implemented as a processor, circuit, and/or instructions 706 stored in the memory 704 and executed by the processor 702.

The sub-slot/slot mapping module 708 may be used for various aspects of the present disclosure, for example, aspects of FIGS. 2-6 and 9-10. The sub-slot/slot mapping module 708 is configured to enable the UE 700 to gain access to a channel in unlicensed spectrum during a sub-slot of a current slot by performing a successful CCA and retain the channel across a slot boundary into an adjacent subsequent slot. In some instances, the UE 700 may retain the channel during the subsequent slot without performing another CCA. For example, the UE 700 may transmit a TB via a sub-PSSCH in the sub-slot and transmit another TB via a PSSCH in the subsequent slot without performing another CCA. By the UE 700 transmitting the TB within at least one sub-slot of the current slot followed by transmitting another TB in an adjacent slot without performing another CCA, the UE 700 may increase the capacity of the wireless network and/or reduce UE 700 power consumption as compared to performing an additional CCA in order to transmit another TB in the adjacent slot.

As shown, the transceiver 710 may include the modem subsystem 712 and the RF unit 714. The transceiver 710 can be configured to communicate bi-directionally with other devices, such as the BSs 105 and/or the UEs 115. The modem subsystem 712 may be configured to modulate and/or encode the data from the memory 704 and the sub-slot/slot mapping module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

In some instances, the UE 700 can include multiple transceivers 710 implementing different RATs (e.g., NR and LTE). In some instances, the UE 700 can include a single transceiver 710 implementing multiple RATs (e.g., NR and LTE). In some instances, the transceiver 710 can include various components, where different combinations of components can implement RATs.

In some aspects, the processor 702 may be coupled to the memory 704, the sub-slot/slot mapping module 708, and/or the transceiver 710. The processor 702 and may execute operating system (OS) code stored in the memory 704 in order to control and/or coordinate operations of the sub-slot/slot mapping module 708 and/or the transceiver 710. In some aspects, the processor 702 may be implemented as part of the sub-slot/slot mapping module 708.

Figure 8:
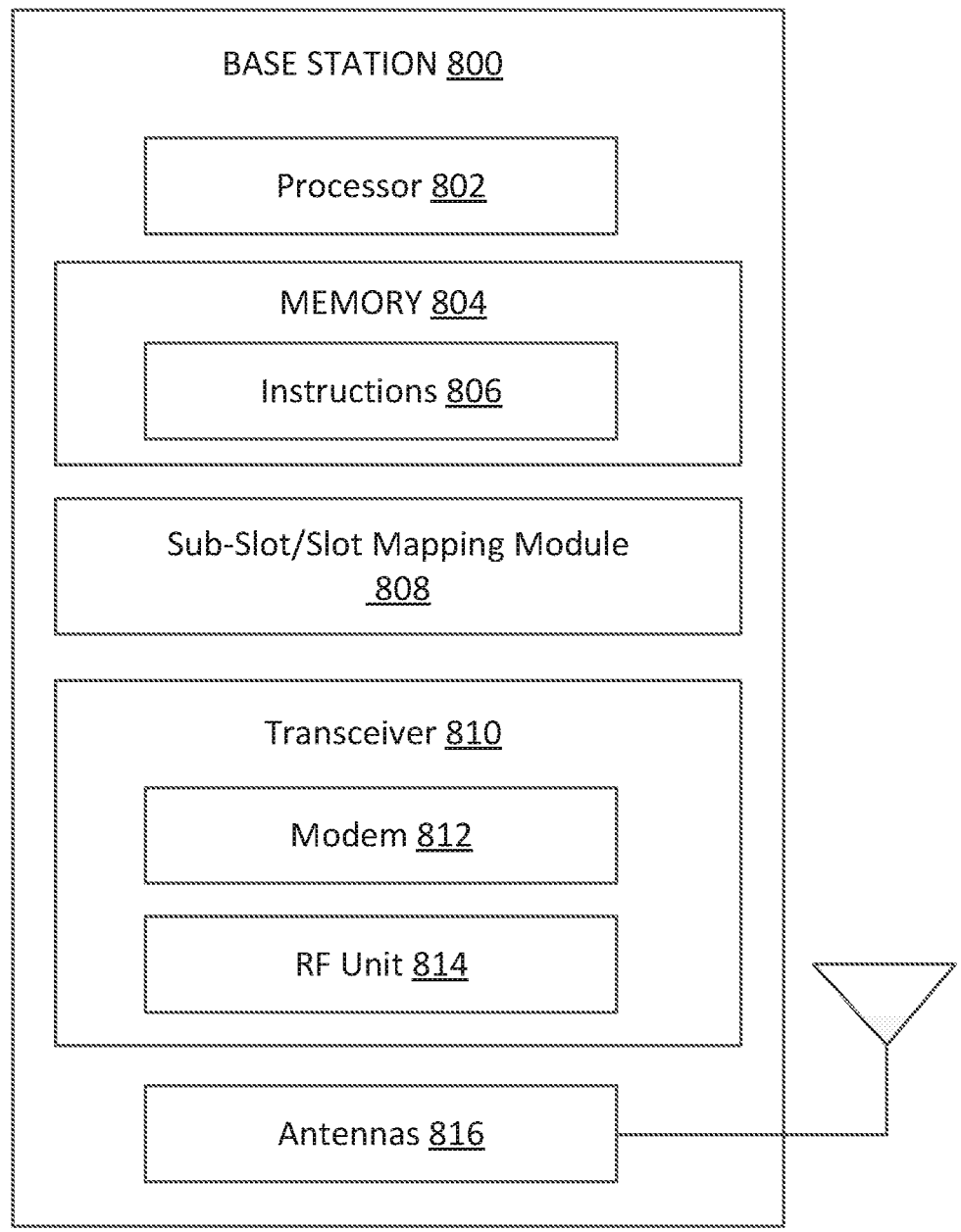
FIG. 8 is a block diagram of an exemplary base station (BS) according to some aspects of the present disclosure.

FIG. 8 is a block diagram of an exemplary BS 800 according to some aspects of the present disclosure. The BS 800 may be a BS 105 as discussed above. As shown, the BS 800 may include a processor 802, a memory 804, a sub-slot mapping module 808, a transceiver 810 including a modem subsystem 812 and a RF unit 814, and one or more antennas 816. These elements may be coupled with each other and in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 2-6 and 9-10. Instructions 806 may also be referred to as code, which may be interpreted broadly to include any type of computer-readable statement(s).

The sub-slot/slot mapping module 808 may be implemented via hardware, software, or combinations thereof. For example, the sub-slot/slot mapping module 808 may be implemented as a processor, circuit, and/or instructions 806 stored in the memory 804 and executed by the processor 802.

The sub-slot/slot mapping module 808 may be used for various aspects of the present disclosure, for example, aspects of FIGS. 2-6 and 9-10. The sub-slot/slot mapping module 808 is configured to transmit, to a UE (e.g., the UE 115, the UE 700), a configuration indicating LBT parameters that defines the parameters for the UE 115 or UE 700 to access the channel. For example, the BS 800 may configure the time resources and/or frequency resources associated with the sub-slots including a sub-slot RP and/or a slot RP. The configuration may further include a starting subchannel index associated with the sub-slot and a number of subchannels associated with the sub-slot. The configuration may include a modulation and coding scheme for decoding a second-stage SCI-2 and/or the sub-PSSCH of the sub-slot. The configuration may include a search space period associated with the plurality of sub-slots.

Additionally or alternatively, the sub-slot/slot mapping module 808 can be implemented in any combination of hardware and software, and may, in some implementations, involve, for example, processor 802, memory 804, instructions 806, transceiver 810, and/or modem 812.

As shown, the transceiver 810 may include the modem subsystem 812 and the RF unit 814. The transceiver 810 can be configured to communicate bi-directionally with other devices, such as the UEs 115 and/or 800. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, a configuration indicating a plurality of sub-slots within a slot according to aspects of the present disclosure. The antennas 816 may further receive data messages transmitted from other devices and provide the received data messages for processing and/or demodulation at the transceiver 810. The antennas 816 may include multiple antennas of similar or different designs in order to sustain multiple transmission links.

In some instances, the BS 800 can include multiple transceivers 810 implementing different RATs (e.g., NR and LTE). In some instances, the BS 800 can include a single transceiver 810 implementing multiple RATs (e.g., NR and LTE). In some instances, the transceiver 810 can include various components, where different combinations of components can implement RATs.

In some aspects, the processor 802 may be coupled to the memory 804, the sub-slot mapping module 808, and/or the transceiver 810. The processor 802 may execute OS code stored in the memory 804 to control and/or coordinate operations of the sub-slot mapping module 808, and/or the transceiver 810. In some aspects, the processor 802 may be implemented as part of the sub-slot mapping module 808. In some aspects, the processor 802 is configured to transmit via the transceiver 810, to a UE, an indicator indicating a configuration of sub-slots within a slot.

Figure 9:
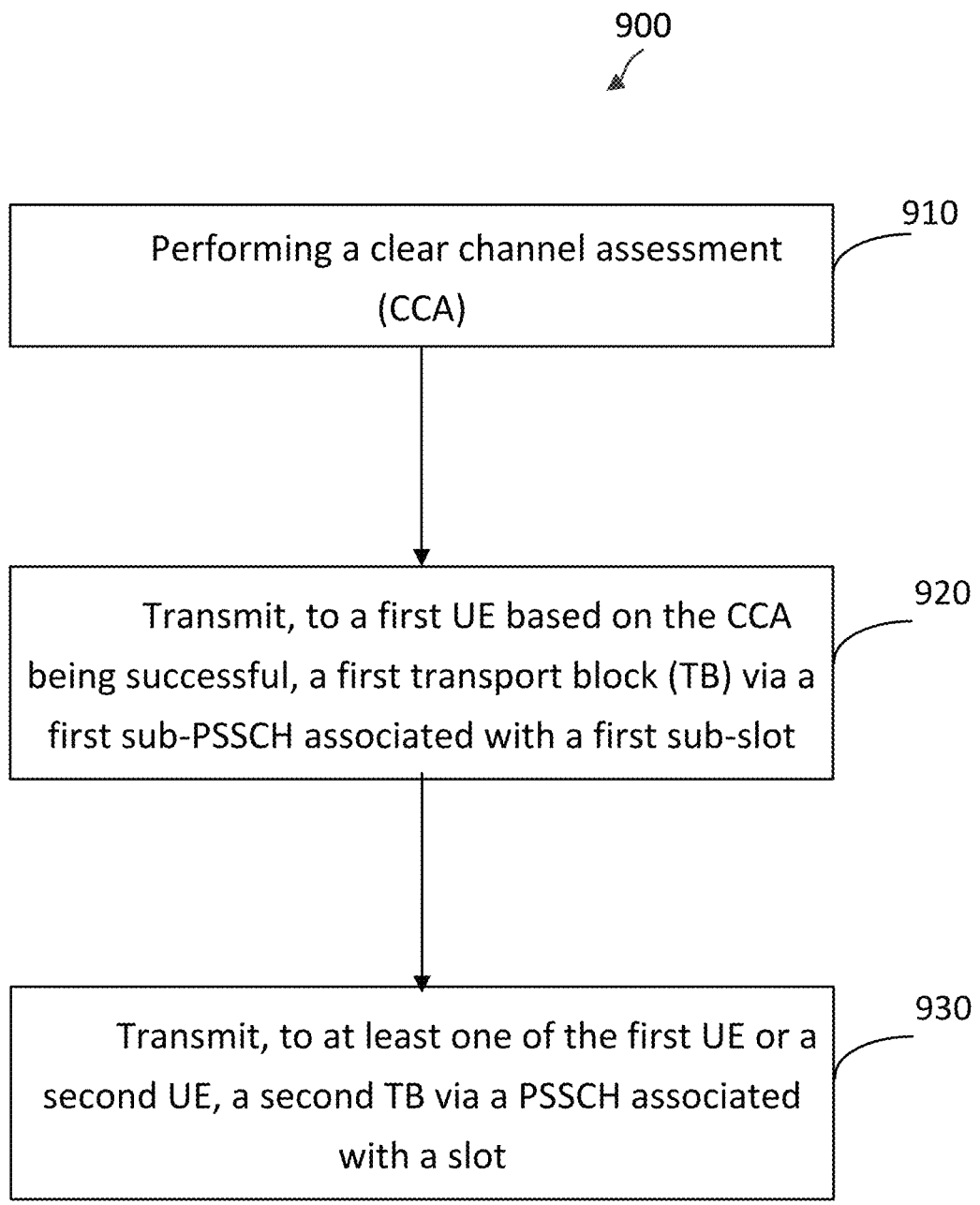
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UE 115 or UE 700, may utilize one or more components, such as the processor 702, the memory 704, the sub-slot/slot mapping module 708, the transceiver 710, the modem 712, and the one or more antennas 716, to execute aspects of method 900. The method 900 may employ similar mechanisms as in the networks 100 and 200 and the aspects and actions described with respect to FIGS. 2-6. As illustrated, the method 900 includes a number of enumerated steps, but the method 900 may include additional steps before, after, and in between the enumerated steps. In some aspects, one or more of the enumerated steps may be omitted or performed in a different order.

At 910, the method 900 includes a UE (e.g., the UE 115 or the UE 700) performing a clear channel assessment (CCA). In some aspects, the UE may communicate over an unlicensed spectrum. One issue of operating in an unlicensed spectrum is to ensure coexistence with other unlicensed systems (e.g., Wi-Fi). In some instances, a sidelink UE device may operate in a manner that limits the impact on other devices operating in the same unlicensed band. For example, in some aspects, standards regulations may mandate the use of listen-before-talk (LBT) protocols. LBT is a spectrum sharing mechanism by which a device senses the spectrum band using a clear channel assessment (CCA) check before accessing the channel. The UE may first sense the communications channel to determine if there are other devices using the channel prior to any transmission by the UE. In some aspects, the channel sensing procedure may rely on detecting energy levels on one or multiple sub-bands of the frequency band.

The LBT parameters (e.g., type of LBT (e.g., a frame-based equipment (FBE)-based LBT and/or a load-based equipment (LBE)-based LBT), category of LBT (e.g., CAT2-LBT and/or CAT4-LBT), duration of sensing, CCA parameters, etc.) may be determined and/or configured by a BS. For example, the CCA parameters may include a back-off time period after an unsuccessful LBT, a contention window size, the energy detection threshold, discovery reference signal timing etc. In some instances, the UE may receive one or more LBT parameters from the BS. The UE may receive the one or more LBT parameters via a radio resource control (RRC) message and/or a downlink control information (DCI) message (e.g., a unicast DCI3 message and/or a groupcast DCI3 message). The UE may perform a FBE-based LBT and/or an LBE-based LBT. In the FBE-based LBT, channel sensing may be performed at predetermined times. For instance, if the channel is sensed to be busy, the UE may wait for a predetermined time period and sense the channel again after the predetermined time period. In the LBE-based LBT, channel sensing may be performed at any time instant and a random waiting time period may be used if the channel is sensed to be busy. In some aspects, the UE may perform a successful CCA by sensing the energy in the channel and determining the sensed energy is below a CCA threshold. If the energy level in the channel is below the CCA threshold, then the UE may transmit for a duration, which may be referred to as a channel occupancy time (COT). Sidelink communication may include a mode 1 operation in which the UEs are in a coverage area of a BS. In mode 1 operation, the UEs may receive the LBT parameters from the BS that defines the parameters for the UEs to access the channel. Sidelink communication may also include a mode 2 operation in which the UEs operate autonomously from the BS and perform LBT/CCA sensing of the channel to gain access to the channel. In some aspects, a UE operating in mode 1 may receive the LBT parameters from the BS and transmit the parameters to another UE operating in mode 2. As described below, the UE may transmit in a sub-slot based on a successful CCA. The UE may also transmit in a slot after the sub-slot without performing another CCA.

At 920, the method 900 includes a UE transmitting, to another UE (e.g., the UE 115 or the UE 700) based on the CCA at 910 being successful, a first transport block (TB) via a first sub-PSSCH associated with a first sub-slot. The UE may transmit the first TB to another UE within sidelink communication range of the UE. The UE may gain access to the channel based on a successful CCA (e.g., the CCA at 910) and transmit the TB in a sub-slot of the plurality of sub-slots within the slot. In some aspects, the UE may transmit a TB in each sub-slot of the plurality of sub-slots within the slot. The UE may transmit a TB in each sub-slot to one and/or multiple different UEs. Accordingly, the UE may transmit multiple TBs to a single UE and/or transmit different TBs to different UEs via the plurality of sub-slots within the slot.

In some aspects, the UE may transmit padding in at least one sub-slot of the plurality of sub-slots. For example, the UE may transmit a TB that includes padding in at least one sub-slot. The padding may include random data. The padding may be transmitted by the UE without a particular UE destination ID. In some aspects, the padding may be transmitted in at least one sub-slot (e.g., the last sub-slot of the plurality of sub-slots) in order to reduce the probability of a successful CCA by another UE. Reducing the probability of a successful CCA by another UE may enable the UE to maintain access to the channel. For example, in some instances, the UE may transmit a TB in a leading sub-slot and transmit padding in one or more subsequent sub-slots up to a border between the last sub-slot of the current slot and a subsequent slot. This may allow the UE to maintain access to the channel for the subsequent slot.

In some aspects, the UE may map a sub-slot of a plurality of sub-slots within a slot as described above with reference to FIGS. 2-4. The UE may map a sub-PSCCH, a sub-PSSCH, an automatic gain control (AGC) symbol, and/or sidelink control information (SCI) to each sub-slot of the plurality of sub-slots of the slot. A first stage SCI-1 may be carried on the sub-PSCCH while a second stage SCI-2 may be carried on the corresponding sub-PSSCH. For example, the UE may transmit a sub-PSCCH/first stage SCI-1 to other sidelink UEs in the network. The sub-PSCCH/first stage SCI-1 may indicate resources that are reserved by the UE (e.g., for transmissions and/or retransmissions). Each receiving UE may decode the first stage SCI-1 to determine where the reserved resources are located (e.g., in order to refrain from using resources that are reserved for another sidelink transmission and/or to reduce resource collision within the wireless communications network).

In some aspects, the UE may partition a slot into a plurality of sub-slots and map a sub-PSSCH to each sub-slot of the plurality of slots. Each sub-PSSCH of each sub-slot may occupy one or more symbols. The sub-PSSCHs may carry one or more TBs that include data to be communicated by a transmitting UE to a receiving UE. The number of symbols the sub-PSSCH occupies may be based on the size of the TB.

In some aspects, the UE may map an AGC symbol to at least one sub-slot of the slot. Another UE may receive a TB from the UE in a sub-PSSCH whose signal strength may vary over a wide dynamic range depending on channel attenuation, interference, and/or other conditions. The AGC symbol may be used to adjust the strength of the received signal in order to reduce the quantization error at the analog-to-digital converter of the receiving UE. In some instances, the AGC symbol may help a receiving UE adjust the gain of a front-end amplifier of a receiver. In some aspects, the UE may map the AGC symbol to the leading (e.g., the earliest in time) symbol in the earliest sub-slot of the plurality of sub-slots in the slot. The UE may map the AGC symbol to the leading symbol in order for a receiving UE to set the gain of the amplifier and successfully decode the subsequent symbols of the sub-slot. In some aspects, the UE may map the AGC symbol to only the leading symbol of the leading sub-slot and refrain from mapping the AGC symbol to the non-leading sub-slots in order for the receiving UEs to set the gain of an amplifier based on the AGC symbol in the leading sub-slot and successfully decode the subsequent symbols of the subsequent sub-slots. In some aspects, omitting the AGC symbol in the non-leading sub-slots (e.g., the subsequent sub-slots) may enable the UE to map an additional symbol to a sub-PSSCH in the non-leading sub-slots, enabling larger TBs to be transmitted in the non-leading sub-slots.

In some aspects, the UE may map a gap symbol to the last symbol of the last sub-slot of the plurality of sub-slots. The gap symbol may occupy a full symbol. The gap symbol may be used by UEs for timing adjustments and/or switching between transmitting and receiving. In some aspects, the UE may refrain from mapping a gap symbol in the last symbol of the last sub-slot of the plurality of sub-slots. Instead of mapping the gap symbol in the last symbol of the last sub-slot of the plurality of sub-slots, the UE map a sub-PSSCH to the last symbol of the last sub-slot of the plurality of sub-slots. A gap symbol may be a time period in which the UE refrains from transmitting. When the UE refrains from transmitting during the gap symbol, another wireless device may perform an LBT/CCA and sense the channel is not occupied. The other wireless device may gain the channel based on a successful CCA. To prevent another device from gaining the channel, the UE may refrain from mapping a gap symbol in the last sub-slot of a slot and instead transmit a TB in a sub-PSSCH in the last sub-slot of the slot. The TB transmitted in the last sub-slot may include data and/or padding. By occupying the channel with a sub-PSSCH, the UE may prevent another device from gaining access to the channel and allow the UE to retain use of the channel for the next slot.

At 930, the method 900 includes the UE transmitting, to another UE (e.g., the UE 115 or the UE 700), a second TB via a PSSCH associated with a slot. The UE may transmit the second TB to the same UE the UE transmitted the first TB to or a different UE. As described above, at 910 and 920, the UE may gain the channel by performing a successful CCA and transmit a first TB via a sub-PSSCH in a sub-slot of a plurality of sub-slots. In some aspects, a subsequent slot may follow the slot having the plurality of sub-slots. The subsequent slot may immediately follow the plurality of sub-slots in time (e.g., the sub-slot may be adjacent to the slot). In this regard, the sub-slot may border a slot boundary and the slot may border the same slot boundary (e.g., the slot boundary between the current slot and the immediately subsequent slot). In some aspects, the UE may gain the channel during a sub-slot of the current slot and retain the channel across the slot boundary into the adjacent subsequent slot. In some instances, the UE may retain the channel during the subsequent slot without performing another CCA. For example, the UE may transmit the second TB via a PSSCH in the subsequent slot without performing another CCA. By the UE transmitting at least one TB within at least one sub-slot of the current slot followed by transmitting another TB in an adjacent slot without performing another CCA, the UE may increase the capacity of the wireless network and/or reduce UE power consumption as compared to performing an additional CCA in order to transmit another TB in the adjacent slot.

In some aspects, the UE may receive, from a BS (e.g., BS 105 or BS 800), a configured grant (CG) associated with a resource allocation for a plurality of sub-slots. In this regard, the UE may operate in sidelink mode 1 and receive the CG from the BS in an RRC message and/or a DCI message (e.g., a unicast DCI3 message and/or a groupcast DCI3 message).

The configured grant may indicate the resources/parameters for configuring the sub-slots of the plurality of sub-slots of a slot. In this regard, the CG may include a search space configuration and/or resources/parameters associated with a second stage SCI-2, sub-PSSCHs, and/or other aspects of the sub-slots. The CG may indicate the time resources and/or frequency resources associated with the plurality of sub-slots. In this regard, the CG may indicate a starting subchannel index associated with the plurality of sub-slots. The starting subchannel index may indicate a starting frequency resource associated with the plurality of sub-slots. The CG may include a number of subchannels associated with the plurality of sub-slots. In some instances, the UE may utilize one or more of the subchannels associated with the plurality of sub-slots to transmit one or more TBs. For example, the UE may transmit the first TB in a first subchannel and transmit the second TB in a second subchannel, different from the first subchannel. In some aspects, the UE may transmit different TBs to different UEs in different subchannels. The subchannels may include frequencies or frequency ranges that include one or more resource elements, subcarriers, subchannels, channels, bands, etc.

In some instances, the CG may include a beta offset and a modulation and coding scheme (MCS) associated with the plurality of sub-slots. The MCS may include the modulation format and coding rate applied to the sub-PSSCH and/or the PSSCH. The MCS may be used by receiving UEs to decode received transmissions. The beta offset may indicate the coding rate for transmitting the second stage SCI-2. The beta offset may indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18. The CG may indicate a search space period associated with the plurality of sub-slots. In some aspects, a receiving UE may perform blind decoding on a second stage SCI-2 in the sub-PSSCH of the sub-slot based on the search space period. In some aspects, the UE may map the sub-PSSCH, the AGC, and/or the second-stage SCI-2 to each sub-slot of the plurality of sub-slots based on the parameters received in the CG.

In some aspects, the UE may receive a sub-slot resource pool (RP) and a slot RP configuration indicating a plurality of subchannels in an unlicensed subband. In this regard, the UE may receive a sub-slot RP and a slot RP that indicates a subchannel size for frequencies in an unlicensed frequency spectrum (e.g., an industrial, scientific and medical (ISM) frequency band). In this regard, the unlicensed spectrum may include a 2400 MHz to 2500 MHz band, a 5180 MHz to 5875 MHz band, or any other unlicensed frequency band. The subchannel size may include any range of frequencies. For example, the subchannel size may include, without limitation, a 5 MHz band of frequencies, a 10 MHz band of frequencies, a 20 MHz band of frequencies, etc. The UE may transmit TBs in one or more subchannels of the plurality of subchannels in the unlicensed band.

Figure 10:
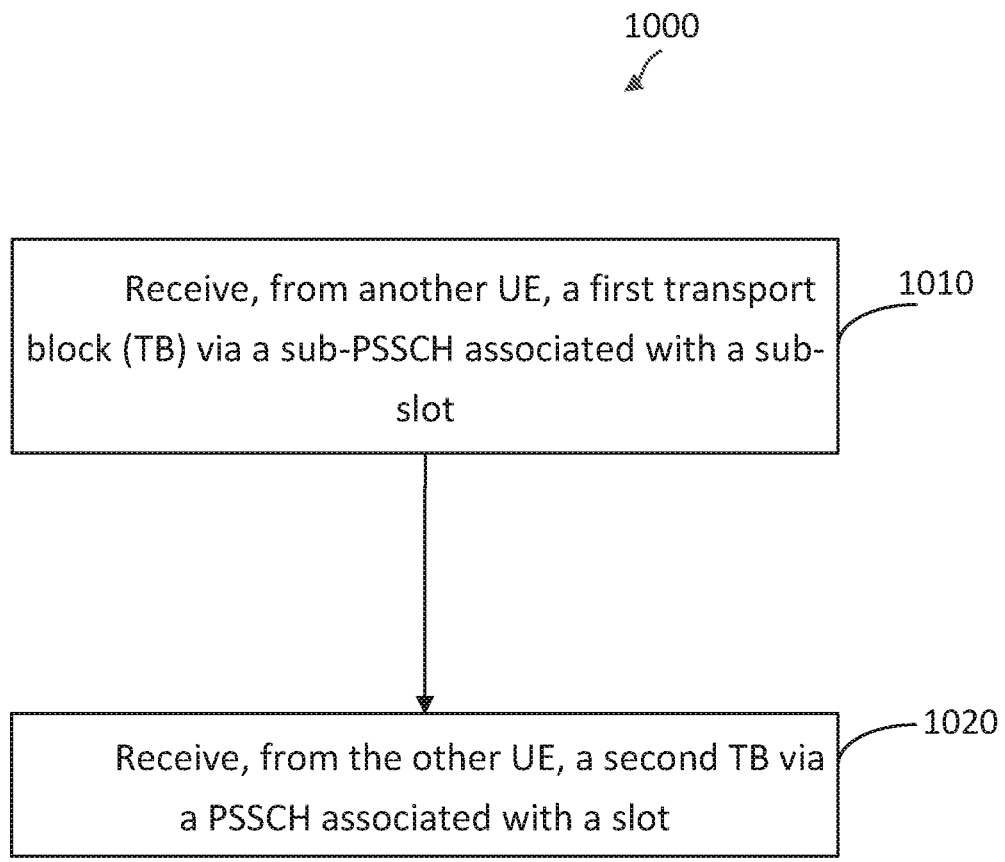
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UE 115 or UE 700, may utilize one or more components, such as the processor 702, the memory 704, the sub-slot/slot mapping module 708, the transceiver 710, the modem 712, and the one or more antennas 716, to execute aspects of method 1000. The method 1000 may employ similar mechanisms as in the networks 100 and 200 and the aspects and actions described with respect to FIGS. 2-6. As illustrated, the method 1000 includes a number of enumerated steps, but the method 1000 may include additional steps before, after, and in between the enumerated steps. In some aspects, one or more of the enumerated steps may be omitted or performed in a different order.

At 1010, the method 1000 includes a UE (e.g., the UE 115 or the UE 700) receiving, from another UE, a first transport block (TB) via a sub-PSSCH associated with a sub-slot of a plurality of sub-slots of a slot. The receiving UE may receive the TB from a transmitting UE in an unlicensed spectrum. The receiving UE may receive the TB from a transmitting UE that has gained access to the channel in the unlicensed spectrum by performing a successful CCA. The receiving UE may receive a configuration from a BS that configures the UE to receive the TB. In this regard, the UE may operate in sidelink mode 1 and receive the CG from a BS in an RRC message and/or a DCI message (e.g., a unicast DCI3 message and/or a groupcast DCI3 message). Sidelink communication may include a mode 1 operation in which the UE is in a coverage area of a BS. In mode 1 operation, the UE may receive the LBT parameters from the BS that defines the parameters for the UE to access the channel. Sidelink communication may also include a mode 2 operation in which the UE may operate autonomously from the BS and perform LBT/CCA sensing of the channel to gain access to the channel. For example, the UE may receive, from the BS, a configuration that indicates the time resources and/or frequency resources associated with the sub-slot of a plurality of sub-slots of a slot that carries the TB. The configuration may further include a starting subchannel index associated with the sub-slot and a number of subchannels associated with the sub-slot. The configuration may include a modulation and coding scheme for decoding a second-stage SCI-2 and/or the sub-PSSCH of the sub-slot.

The configuration may include a search space period associated with the plurality of sub-slots. In some aspects, the UE may perform blind decoding on the second stage SCI-2 in the sub-PSSCH of the sub-slot based on the search space period. The UE may monitor for a demodulation reference signal (DMRS). The DMRS may be a reference signal used by the receiving UE for channel estimation and/or compensating for Doppler effects. The DMRS may be included in at least one sub-slot of the plurality of sub-slots of the slot. In this regard, the DMRS may be located anywhere within the sub-slot. For example, the DMRS may be located in the first symbol of the sub-slot, the last symbol of the sub-slot, or an intermediate symbol of the sub-slot. In some aspects, the DMRS may include all resource elements (REs) within the symbol. In some aspects, the DMRS may include a portion of the REs within the symbol. For example, the DMRS may include a portion of the REs within the same symbol that occupies the second stage SCI-2. The UE may perform blind decoding on the second stage SCI-2 in the sub-PSSCH of the sub-slot based on the DMRS. For example, if the UE successfully detects a DMRS, the UE may perform blind decoding on the second stage SCI-2. If the UE does not successfully detect a DMRS, the UE may refrain from performing blind decoding on the second stage SCI-2. In this regard, the UE may conserve power consumption by refraining from performing blind decoding on the second stage SCI-2. In some aspects, a longer search space period may reduce the frequency of performing blind decoding and therefore reduce power consumption in the UE as compared to a shorter search space period that may increase the frequency of blind decoding.

In some aspects, the UE may receive, from the BS, a configuration indicating at least one subchannel within at least one subband. The UE may perform blind decoding on a second-stage SCI-2 in a subchannel of the at least one subchannel within the at least one subband. The UE may receive the TB in an unlicensed spectrum. In this regard, the unlicensed spectrum may include a 2400 MHz to 2500 MHz band, a 5180 MHz to 5875 MHz band, or any other unlicensed frequency band. The subchannel size may include any range of frequencies. For example, the subchannel size may include, without limitation, a 5 MHz band of frequencies, a 10 MHz band of frequencies, a 20 MHz band of frequencies, etc. The UE may perform second-stage SCI-2 blind decoding on the subchannels indicated in the configuration. In some aspects, the UE may perform blind decoding on a subset of subchannels instead of all subchannels in order to reduce computing resources and power consumption in the UE.

At 1020, the UE may receive, from the other UE, a second TB via a PSSCH associated with a slot. In some aspects, a subsequent slot may follow the slot having the plurality of sub-slots. The subsequent slot may immediately follow the plurality of sub-slots in time (e.g., the sub-slot may be adjacent to the slot). In this regard, the sub-slot may border a slot boundary and the slot may border the same slot boundary (e.g., the slot boundary between the current slot and the immediately subsequent slot). The receiving UE may receive a first TB from the transmitting UE in a sub-slot of the current slot. The UE may receive a second TB from the transmitting UE in the subsequent slot that borders the sub-slot of the current slot. In this case, the transmitting UE may gain the channel based on a successful CCA during the sub-slot, transmit the first TB in at least one sub-slot of the current slot, and transmit the second TB in a PSSCH of the subsequent slot without performing an additional CCA. The receiving UE may detect the boundary between the sub-slot of the current slot and the subsequent slot and receive the second TB based on detecting the boundary. The UE may detect the boundary between the sub-slot of the current slot and the subsequent slot using any method. In this regard, the UE may detect the boundary between the sub-slot of the current slot and the subsequent slot by detecting a resource associated with the subsequent slot. For example, the UE may detect a DMRS, an SCI-1, an SCI-2, a PSCCH, a PSSCH, or a combination thereof associated with the subsequent slot. Additionally or alternatively, the UE may receive, from the other UE, an instruction in a sub-PSSCH that instructs the UE to receive the second TB via the PSSCH associated with the slot. In this regard, the UE may receive an instruction from the other UE in a sub-PSSCH that indicates timing of the slot boundary. For example, the instruction may include a timing offset that indicates the relative timing of the slot boundary. The timing offset may be relative to a symbol of the current slot or the subsequent slot, a sub-slot of the current slot, a previous slot, a frame, etc. The UE may receive the second TB based on the received instruction. In some aspects, the UE may detect the slot boundary and switch from monitoring the sub-slot RP to monitoring the slot RP. In some aspects, when monitoring the slot RP, the UE may not detect the DMRS and/or successfully decode the SCI-1 or PSSCH. In this case, the UE may resume monitoring the sub-slot RP after a preconfigured time period.

In some aspects, the UE may receive, from the BS, a configuration that indicates a group identifier assigned to the UE. The UE may perform blind decoding on a second-stage SCI-2 in each subchannel associated with the group identifier. In some aspects, the UE may receive transmissions in a plurality of subchannels. However, the number of subchannels may be large and place a computational burden on the UE to search all of the subchannels for the second stage SCI-2. The UE may be assigned a group identifier by the BS that is associated with a subset of subchannels. Each UE having the same group identifier may search only the subchannels associated with the group identifier, thereby reducing the number of subchannels the UE must search. This search space reduction may reduce the associated computational burden and power consumption of the UE. In some aspects, the grouping of UEs identified by the group identifier may be based on the network topology and/or spatial relationships between the UEs.

By way of non-limiting examples, the following aspects are included in the present disclosure.

Aspect 1 includes a method of wireless communication performed by a user equipment (UE), the method comprising performing a clear channel assessment (CCA); transmitting, to a first UE based on the CCA being successful, a first transport block (TB) via a first sub-PSSCH associated with a first sub-slot; and transmitting, to at least one of the first UE or a second UE, a second TB via a PSSCH associated with a slot.

Aspect 2 includes the method of aspect 1, wherein the first sub-slot borders a slot boundary and the slot borders the slot boundary.

Aspect 3 includes the method of any of aspects 1-2, wherein the transmitting the second TB comprises transmitting, to the at least one of the first UE or the second UE, the second TB via the PSSCH associated with the slot without performing another CCA.

Aspect 4 includes the method of any of aspects 1-3, further comprising mapping a sub-PSCCH, a sub-PSSCH, an automatic gain control (AGC) symbol, and sidelink control information (SCI) to each sub-slot of a plurality of sub-slots, wherein the plurality of sub-slots includes the first sub-slot; and wherein the transmitting the first TB via the first sub-PSSCH is based at least in part on the mapping.

Aspect 5 includes the method of any of aspects 1-4, further comprising omitting a gap symbol in a last symbol of a last sub-slot of the plurality of sub-slots; and mapping the sub-PSSCH to the last symbol of the last sub-slot of the plurality of sub-slots.

Aspect 6 includes the method of any of aspects 1-5, further comprising mapping an automatic gain control (AGC) symbol to a leading symbol of a leading sub-slot of the plurality of sub-slots.

Aspect 7 includes the method of any of aspects 1-6, further comprising receiving, from a base station (BS), a configured grant (CG) associated with a resource allocation for a plurality of sub-slots; mapping, based on the CG, a sub-PSSCH and second-stage sidelink control information (SCI-2) to each sub-slot of the plurality of sub-slots, wherein the plurality of sub-slots includes the first sub-slot; and mapping, based on the CG, an automatic gain control (AGC) symbol to a leading symbol of a leading sub-slot of the plurality of sub-slots.

Aspect 8 includes the method of any of aspects 1-7, further comprising receiving a sub-slot resource pool (RP) configuration indicating a plurality of subchannels in an unlicensed subband; and wherein the transmitting the first TB via the first sub-PSSCH comprises transmitting the first TB in at least one subchannel of the plurality of subchannels in the unlicensed subband.

Aspect 9 includes the method of any of aspects 1-8, further comprising transmitting, in at least one sub-slot of a plurality of sub-slots, a padding, wherein the plurality of sub-slots includes the first sub-slot.

Aspect 10 includes a method of wireless communication performed by a user equipment (UE), the method comprising receiving, from another UE, a first transport block (TB) via a sub-PSSCH associated with a sub-slot; and receiving, from the other UE, a second TB via a PSSCH associated with a slot.

Aspect 11 includes the method of aspect 10, further comprising detecting a boundary between the sub-slot and the slot; and wherein the receiving the second TB via the PSSCH associated with the slot comprises receiving, from the other UE, the second TB based on detecting the boundary between the sub-slot and the slot.

Aspect 12 includes the method of any of aspects 10-11, further comprising receiving, from the other UE, an instruction in the sub-PSSCH that instructs the UE to receive the second TB via the PSSCH associated with the slot; and wherein the receiving the second TB via the PSSCH associated with the slot comprises receiving, from the other UE, the second TB based on the instruction.

Aspect 13 includes the method of any of aspects 10-12, further comprising receiving, from a base station (BS), a configuration, wherein the configuration indicates at least one of: resources associated with a sub-slot of a plurality of sub-slots; a starting subchannel index associated with the sub-slot; a number of subchannels associated with the sub-slot; a modulation and coding scheme associated with the sub-slot; a beta offset associated with the sub-slot; or a search space period associated with the plurality of sub-slots.

Aspect 14 includes the method of any of aspects 10-13, wherein the receiving the configuration comprises receiving, from the BS, the configuration in a radio resource control (RRC) message.

Aspect 15 includes the method of any of aspects 10-14, wherein the receiving the configuration comprises receiving, from the BS, the configuration indicating the search space period associated with the plurality of sub-slots; and further comprising performing blind decoding on a second-stage sidelink control information (SCI-2) in one sub-slot within the search space period.

Aspect 16 includes the method of any of aspects 10-15, wherein the configuration indicates at least one subchannel within at least one subband; and further comprising performing blind decoding on a second-stage sidelink control information (SCI-2) in a subchannel of the at least one subchannel within the at least one subband.

Aspect 17 includes the method of any of aspects 10-16, further comprising monitoring for a demodulation reference signal (DMRS); and wherein the performing blind decoding on the SCI-2 is based on detecting the DMRS.

Aspect 18 includes the method of any of aspects 10-17, wherein the configuration indicates a group identifier assigned to the UE; and further comprising performing blind decoding on a second-stage sidelink control information (SCI-2) in each subchannel associated with the group identifier.

Aspect 19 includes a user equipment (UE) comprising a transceiver, a memory, and a processor coupled to the transceiver and the memory, the UE configured to perform any one of aspects 1-9.

Aspect 20 includes a user equipment (UE) comprising a transceiver, a memory, and a processor coupled to the transceiver and the memory, the UE configured to perform any one of aspects 10-18.

Aspect 21 includes a non-transitory computer-readable medium storing one or more instructions for wireless communication, the one or more instructions comprising one or more instructions that, when executed by one or more processors of a user equipment, cause the one or more processors to perform any one of aspects 1-9.

Aspect 22 includes a non-transitory computer-readable medium storing one or more instructions for wireless communication, the one or more instructions comprising one or more instructions that, when executed by one or more processors of a user equipment, cause the one or more processors to perform any one of aspects 10-18.

Aspect 23 includes a user equipment (UE) comprising one or more means to perform any one or more of aspects 1-9.

Aspect 24 includes a user equipment (UE) comprising one or more means to perform any one or more of aspects 10-18.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

performing a clear channel assessment (CCA);
transmitting, to a first UE based on the CCA being successful, at least a first portion of a first transport block (TB) via a first sub-PSSCH associated with a first sub-slot of a first slot; and
transmitting, to at least one of the first UE or a second UE, at least one of a second TB or a second portion of the first TB via a second sub-PSSCH associated with a second sub-slot,
wherein the first sub-slot includes at least one symbol allocated for PSSCH and at least one symbol allocated for PSCCH, and
wherein the second sub-slot includes at least one symbol allocated for PSSCH.

2. The method of claim 1, wherein the second sub-slot is a sub-slot of the first slot and borders a slot boundary, further comprising:
transmitting, to at least one of the first UE or the second UE, at least one of a third TB or a third portion of the first TB via a PSSCH associated with a second slot,
wherein the second slot borders the slot boundary.

3. The method of claim 2, wherein:
the transmitting the at least one of the third TB or the third portion of the first TB comprises:
transmitting, to the at least one of the first UE or the second UE, the at least one of the third TB or the third portion of the first TB via the PSSCH associated with the second slot without performing another CCA.

4. The method of claim 1 further comprising:
mapping a sub-PSCCH, a sub-PSSCH, an automatic gain control (AGC) symbol, and sidelink control information (SCI) to each of the first sub-slot and the second sub-slot; and
wherein the transmitting the first TB via the first sub-PSSCH is based at least in part on the mapping.

5. The method of claim 1, wherein:
the second sub-slot is in the first slot,
all of the first TB is transmitted in the first sub-PSSCH, and
all of the second TB is transmitted in the second sub-PSSCH.

6. The method of claim 5, wherein the first sub-slot starts at an earliest starting position of a plurality of starting positions of the first slot.

7. The method of claim 1, wherein:
the second sub-slot is in the first slot,
the first portion of the first TB is transmitted in the first sub-PSSCH, and
the second portion of the first TB is transmitted in the second sub-PSSCH.

8. The method of claim 7, wherein the first sub-slot starts at an earliest starting position of a plurality of starting positions of the first slot.

9. The method of claim 1, wherein:
the second sub-slot is in a second slot,
the first portion of the first TB is transmitted in the first sub-PSSCH, and
the first sub-slot ends at an end of the first slot.

10. A method of wireless communication performed by a user equipment (UE), the method comprising:
receiving, from another UE, at least a first portion of a first transport block (TB) via a first sub-PSSCH associated with a first sub-slot of a first slot; and
receiving, from the other UE, at least one of a second TB or a second portion of the first TB via a second sub-PSSCH associated with a second sub-slot,
wherein the first sub-slot includes at least one symbol allocated for PSSCH and at least one symbol allocated for PSCCH, and
wherein the second sub-slot includes at least one symbol allocated for PSSCH.

11. The method of claim 10, wherein the second sub-slot is in the first slot, further comprising:
detecting a boundary between the second sub-slot and a second slot; and
receiving, from the other UE, a third TB based on detecting the boundary between the second sub-slot and the second slot.

12. The method of claim 10, further comprising:
receiving, from the other UE, an instruction in the first sub-PSSCH that instructs the UE to receive the second TB via a PSSCH associated with a second slot; and
wherein the receiving the second TB via the PSSCH associated with the second slot comprises:
receiving, from the other UE, the second TB based on the instruction.

13. The method of claim 10, further comprising:
receiving, from a base station (BS), a configuration, wherein the configuration indicates at least one of:
resources associated with the first sub-slot;
a starting subchannel index associated with the first sub-slot;
a number of subchannels associated with the first sub-slot;
a modulation and coding scheme associated with the first sub-slot;
a beta offset associated with the first sub-slot; or
a search space period associated with the first sub-slot.

14. The method of claim 10, wherein:
the second sub-slot is in the first slot,
all of the first TB is received in the first sub-PSSCH, and
all of the second TB is received in the second sub-PSSCH.

15. The method of claim 14, wherein the first sub-slot starts at an earliest starting position of a plurality of starting positions of the first slot.

16. The method of claim 10, wherein:
the second sub-slot is in the first slot,
the first portion of the first TB is received in the first sub-PSSCH, and
the second portion of the first TB is received in the second sub-PSSCH.

17. The method of claim 16, wherein the first sub-slot starts at an earliest starting position of a plurality of starting positions of the first slot.

18. The method of claim 10, wherein:
the second sub-slot is in a second slot,
the first portion of the first TB is received in the first sub-PSSCH, and
the first sub-slot ends at an end of the first slot.

19. A user equipment (UE) comprising a transceiver, a memory, and one or more processors coupled to the transceiver and the memory, the one or more processors configured, alone or in any combination, to cause the UE to:
perform a clear channel assessment (CCA);
transmit, to a first UE based on the CCA being successful, at least a portion of a first transport block (TB) via a first sub-PSSCH associated with a first sub-slot of a first slot; and
transmit, to at least one of the first UE or a second UE, at least one of a second TB or a second portion of the first TB via a second sub-PSSCH associated with a second sub-slot, wherein the first sub-slot includes at least one symbol allocated for PSSCH and at least one symbol allocated for PSCCH, and wherein the second sub-slot includes at least one symbol allocated for PSSCH.

20. The UE of claim 19, wherein the second sub-slot is in the first slot and borders a slot boundary, and wherein the one or more processors are further configured to cause the UE to:

transmit, to at least one of the first UE or the second UE, at least one of a third TB or a third portion of the first TB via a PSSCH associated with a second slot, and wherein the second slot borders the slot boundary.

21. The UE of claim 19, wherein the one or more processors are further configured to cause the UE to:

transmit, to the at least one of the first UE or the second UE, the at least one of a third TB or a third portion of the first TB via a PSSCH associated with a second slot without performing another CCA.

22. The UE of claim 19, wherein the one or more processors are further configured to cause the UE to:

map a sub-PSCCH, a sub-PSSCH, an automatic gain control (AGC) symbol, and sidelink control information (SCI) to each of the first sub-slot and the second sub-slot; and transmit the first TB via the first sub-PSSCH based at least in part on the mapping.

23. The UE of claim 19, wherein:

the second sub-slot is in the first slot, all of the first TB is transmitted in the first sub-PSSCH, and all of the second TB is transmitted in the second sub-PSSCH.

24. The UE of claim 23, wherein the first sub-slot starts at an earliest starting position of a plurality of starting positions of the first slot.

25. The UE of claim 19, wherein:

the second sub-slot is in the first slot, the first portion of the first TB is transmitted in the first sub-PSSCH, and the second portion of the first TB is transmitted in the second sub-PSSCH.

26. The UE of claim 25, wherein the first sub-slot starts at an earliest starting position of a plurality of starting positions of the first slot.

27. The UE of claim 19, wherein:

the second sub-slot is in a second slot, the first portion of the first TB is transmitted in the first sub-PSSCH, and the first sub-slot ends at an end of the first slot.

28. A user equipment (UE) comprising a transceiver, a memory, and one or more processors coupled to the transceiver and the memory, the one or more processors configured, alone or in any combination, to cause the UE to:

receive, from another UE, at least a first portion of a first transport block (TB) via a first sub-PSSCH associated with a first sub-slot of a first slot; and receive, from the other UE, at least one of a second TB or a second portion of the first TB via a second sub-PSSCH associated with a second sub-slot, wherein the first sub-slot includes at least one symbol allocated for PSSCH and at least one symbol allocated for PSCCH, and wherein the second sub-slot includes at least one symbol allocated for PSSCH.

29. The UE of claim 28, wherein the one or more processors are further configured to cause the UE to:

detect a boundary between the second sub-slot and a second slot;

receive, from the other UE, the second TB based on detecting the boundary between the second sub-slot and the second slot;

receive, from the other UE, an instruction in the first sub-PSSCH that instructs the UE to receive the second TB via the PSSCH associated with the second slot; and receive, from the other UE, the second TB based on the instruction.

30. The UE of claim 28, wherein the one or more processors are further configured to cause the UE to:

receive, from a base station (BS), a configuration, wherein the configuration indicates at least one of:

resources associated with the first sub-slot;

a starting subchannel index associated with the first sub-slot;

a number of subchannels associated with the first sub-slot;

a modulation and coding scheme associated with the first sub-slot;

a beta offset associated with the first sub-slot; or a search space period associated with the first sub-slot.

* * * * *